United States Patent
He et al.

(10) Patent No.: US 11,863,446 B2
(45) Date of Patent: Jan. 2, 2024

(54) USER GROUP-BASED PACKET FORWARDING METHOD, DEVICE, AND SYSTEM

(71) Applicant: HUAWEI TECHNOLOGIES CO., LTD., Guangdong (CN)

(72) Inventors: Xingjian He, Nanjing (CN); Haibo Wang, Beijing (CN); Zhibo Hu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/190,114

(22) Filed: Mar. 26, 2023

(65) Prior Publication Data

US 2023/0336479 A1 Oct. 19, 2023

Related U.S. Application Data

(63) Continuation of application No. PCT/CN2021/110811, filed on Aug. 5, 2021.

(30) Foreign Application Priority Data

Sep. 30, 2020 (CN) .......................... 202011059313.6
Nov. 26, 2020 (CN) .......................... 202011357010.2

(51) Int. Cl.
*G06F 15/173* (2006.01)
*H04L 45/741* (2022.01)
*H04L 45/00* (2022.01)
*H04L 45/42* (2022.01)

(52) U.S. Cl.
CPC ............ *H04L 45/741* (2013.01); *H04L 45/42* (2013.01); *H04L 45/566* (2013.01)

(58) Field of Classification Search
CPC ...... H04L 45/741; H04L 45/42; H04L 45/566
USPC ........................................................ 709/238
See application file for complete search history.

(56) References Cited

U.S. PATENT DOCUMENTS

| | | | |
|---|---|---|---|
| 11,425,056 B1* | 8/2022 | Kumar | H04L 43/10 |
| 2019/0288873 A1* | 9/2019 | Camarillo Garvia | H04L 45/74 |
| 2019/0288941 A1* | 9/2019 | Filsfils | H04L 69/22 |
| 2021/0243116 A1* | 8/2021 | Filsfils | H04L 45/566 |

* cited by examiner

*Primary Examiner* — Duyen M Doan
(74) *Attorney, Agent, or Firm* — HUAWEI TECHNOLOGIES CO., LTD.

(57) ABSTRACT

A user group-based packet forwarding method and a device are provided. The method includes: a first network device receives a first service packet sent by first user equipment, where the first service packet includes information about the first user equipment; the first network device determines whether the first network device includes a first user group corresponding to the information about the first user equipment; and the first network device determines, based on a determining result, a value of first group information, generates a first segment routing over internet protocol version 6 (SRv6) packet, and sends the first SRv6 packet to a second network device, where the first SRv6 packet includes the first group information and the first service packet, and the first group information indicates an interworking policy that is determined based on the first user group.

20 Claims, 6 Drawing Sheets

| Group policy identifier | Group identifier |
|---|---|

USER GROUP-BASED PACKET FORWARDING METHOD, DEVICE, AND SYSTEM

CROSS-REFERENCE TO RELATED APPLICATIONS

This disclosure is a continuation of International Application No. PCT/CN2021/110811, filed on Aug. 5, 2021, which claims priority to Chinese Patent Application No. 202011059313.6, filed on Sep. 30, 2020, and Chinese Patent Application No. 202011357010.2, filed on Nov. 26, 2020. All of the aforementioned patent applications are hereby incorporated by reference in their entireties.

TECHNICAL FIELD

This disclosure relates to the field of communication technologies, and in particular, to a user group-based packet forwarding method, a device, and a system.

BACKGROUND

Currently, internet protocol version 4 (IPv4) is a widely deployed internet protocol. The IPv4 technology is simple, easy to implement, and has good interoperability. However, an important lesson of IPv4 technology development is a scalability problem. At the beginning of the design, it is unexpected that so many devices will access an internet protocol (IP) network. This triggers development of an internet protocol version 6 (IPv6) technology. IPv6 replaces IPv4 mainly to resolve a problem of IPv4 address exhaustion. In addition, IPv6 also has many improvements on IPv4 in other aspects. However, an important lesson of IPv6 technology development is a compatibility problem. The idea at that time is simple. 32-bit address space is insufficient. Therefore, the 32-bit address space is expanded to 128 bits. However, a 128-bit IPv6 address is incompatible with a 32-bit IPv4 address. In this case, it is necessary to upgrade an entire network to support IPv6. This leads to difficulties in deploying applications. From this perspective, segment routing over internet protocol version 6 (SRv6) is compatible with IPv6 routing and forwarding, and also has an advantage of multiprotocol label switching (MPLS) forwarding. This ensures smooth evolution of SRv6 from an IPv6 network.

A segment routing (SR) technology is that a source node specifies a path for an application packet, converts the path into an ordered segment list, and encapsulates the list into a packet header. An intermediate node on the path needs to perform forwarding based only on the path specified in the packet header. A segment is any instruction that instructs a device to process a packet, for example, forward the packet to a destination through a shortest path, forward the packet through a specified interface, and forward the packet to a specified application or service instance. To implement SRv6 forwarding in IPv6, an SRv6 extension header, namely, a segment routing header (SRH), is introduced into an IPv6 packet. This is for segment programming and combining, to generate an SRv6 path. Standardization of SRv6 is promoted mainly by the Internet Engineering Task Force (IETF) SPRING (Source Packet Routing in Networking) working group, and standardization of a packet encapsulation format SRH and the like of SRv6 is conducted by the 6MAN (IPv6 Maintenance) working group.

However, in an SRv6-based communication network scenario, a packet forwarding technology based on a user group and a group policy cannot be implemented using an existing SRv6-related protocol.

SUMMARY

This disclosure provides a user group-based packet forwarding method, a device, and a system, to implement a packet forwarding technology based on a user group and a group policy in an SRv6-based communication network scenario.

According to a first aspect, a user group-based packet forwarding method is provided. The method includes: A first network device receives a first service packet sent by first user equipment, where the first service packet includes information about the first user equipment, and a destination of the first service packet is second user equipment. Then, the first network device determines whether the first network device includes a first user group corresponding to the information about the first user equipment, where the first user group is a user group to which the first user equipment belongs. In addition, the first network device determines, based on a determining result of whether the first network device includes the first user group corresponding to the information about the first user equipment, a value of first group information, and generates a first SRv6 packet, where the first SRv6 packet includes the first group information and the first service packet, and the first group information indicates an interworking policy that is determined by the first network device based on the first user group and that is for transmitting the first service packet between the first user equipment and the second user equipment. In addition, the first network device sends the first SRv6 packet to a second network device.

Based on the solution provided in this disclosure, an SRv6 packet sent by the first network device to the second network device carries group information, so that the first network device serving as a transmitting end device may participate in control of determining a forwarding policy for a user group.

In a possible implementation of the first aspect, the first group information includes a first group identifier. The first group identifier indicates a user group to which the first user equipment belongs. That the first network device determines, based on the determining result of whether the first network device includes the first user group corresponding to the information about the first user equipment, the value of the first group information includes: in response to that the first network device determines that the first network device includes the first user group corresponding to the information about the first user equipment, the first network device determines that a value of the first group identifier indicates the first user group.

In another possible implementation of the first aspect, the first group information includes a first group identifier. The first group identifier indicates a user group to which the first user equipment belongs. That the first network device determines, based on the determining result of whether the first network device includes the first user group corresponding to the information about the first user equipment, the value of the first group information includes: in response to that the first network device determines that the first network device does not include the first user group corresponding to the information about the first user equipment, the first network device determines that a value of the first group identifier indicates "invalid".

In still another possible implementation of the first aspect, the first group information includes a first group identifier and a first group policy identifier. The first group identifier indicates a user group to which the first user equipment belongs. The first group policy identifier indicates a specific interworking policy.

In still another possible implementation of the first aspect, the first group policy identifier includes a first identifier. The first identifier indicates that the first network device includes the first user group and the second network device does not include a second user group. The second user group is a user group to which the second user equipment belongs. That the first network device determines, based on the determining result of whether the first network device includes the first user group corresponding to the information about the first user equipment, the value of the first group information includes: in response to that the first network device determines that the first network device includes the first user group corresponding to the information about the first user equipment, the first network device determines that a value of the first group identifier indicates the first user group, and determines a value of the first identifier.

In still another possible implementation of the first aspect, the first group policy identifier includes a second identifier and a third identifier. The second identifier indicates that the first network device does not include the first user group and the second network device includes a second user group. The third identifier indicates that the first network device does not include the first user group and the second network device does not include the second user group. The second user group is a user group to which the second user equipment belongs. That the first network device determines, based on the determining result of whether the first network device includes the first user group corresponding to the information about the first user equipment, the value of first group information includes: in response to that the first network device determines that the first network device includes the first user group corresponding to the information about the first user equipment, the first network device determines that a value of the first group identifier indicates "invalid", and determines a value of the second identifier and a value of the third identifier.

In still another possible implementation of the first aspect, the first group policy identifier includes a fourth identifier. The fourth identifier indicates that the second network device does not include a second user group. The second user group is a user group to which the second user equipment belongs. That the first network device determines, based on the determining result of whether the first network device includes the first user group corresponding to the information about the first user equipment, the value of the first group information includes: in response to that the first network device determines that the first network device includes the first user group corresponding to the information about the first user equipment, the first network device determines that a value of the first group identifier indicates the first user group, and determines a value of the fourth identifier.

In still another possible implementation of the first aspect, the first group policy identifier includes a fifth identifier and a sixth identifier. The fifth identifier indicates that the second network device includes a second user group. The sixth identifier indicates that the second network device does not include the second user group. The second user group is a user group to which the second user equipment belongs. That the first network device determines, based on the determining result of whether the first network device includes the first user group corresponding to the information about the first user equipment, the value of the first group information includes: in response to that the first network device determines that the first network device includes the first user group corresponding to the information about the first user equipment, the first network device determines that a value of the first group identifier indicates "invalid", and determines a value of the fifth identifier and a value of the sixth identifier.

According to a second aspect, a user group-based packet forwarding method is provided. The method includes: A second network device receives a first SRv6 packet sent by a first network device, where the first SRv6 packet includes first group information and a first service packet, the first group information indicates an interworking policy that is determined by the first network device based on a first user group and that is for transmitting the first service packet between first user equipment and second user equipment, the first service packet is from the first user equipment, a destination of the first service packet is the second user equipment, the first user group is a user group to which the first user equipment belongs, and the first service packet includes information about the second user equipment. Then, the second network device determines whether the second network device includes a second user group corresponding to the information about the second user equipment, where the second user group is a user group to which the second user equipment belongs. In addition, the second network device determines, based on the first group information and a determining result of whether the second network device includes the second user group corresponding to the information about the second user equipment, a forwarding policy for forwarding the first service packet to the second user equipment.

Based on the solution provided in this disclosure, the second network device receives the first SRv6 sent by the first network device, and the second network device serving as a receiving end device may control a forwarding policy of a user group according to an interworking policy determined by a transmitting end device and an interworking policy determined by the receiving end device.

In a possible implementation of the second aspect, the first group information includes a first group identifier. The first group identifier indicates a user group to which the first user equipment belongs. That the second network device determines, based on the first group information and the determining result of whether the second network device includes the second user group corresponding to the information about the second user equipment, the forwarding policy for forwarding the first service packet to the second user equipment includes: in response to that the second network device determines that the second network device includes the second user group corresponding to the information about the second user equipment and that a value of the first group identifier indicates the first user group, the second network device sends the first service packet to the second user equipment.

In another possible implementation of the second aspect, the first group information includes a first group identifier. The first group identifier indicates a user group to which the first user equipment belongs. That the second network device determines, based on the first group information and the determining result of whether the second network device includes the second user group corresponding to the information about the second user equipment, the forwarding policy for forwarding the first service packet to the second user equipment includes: in response to that the second network device determines that the second network device does not include the second user group corresponding to the information about the second user equipment and that a value of the first group identifier indicates the first user group, the second network device sends the first service packet to the second user equipment in a random drop manner or in a rate-limited forwarding manner.

In still another possible implementation of the second aspect, the first group information includes a first group identifier. The first group identifier indicates a user group to which the first user equipment belongs. That the second network device determines, based on the first group information and the determining result of whether the second network device includes the second user group corresponding to the information about the second user equipment, the forwarding policy for forwarding the first service packet to the second user equipment includes: in response to that the second network device determines that the second network device includes the second user group corresponding to the information about the second user equipment and that a value of the first group identifier indicates "invalid", the second network device sends the first service packet to the second user equipment in a random drop manner or in a rate-limited forwarding manner.

In still another possible implementation of the second aspect, the first group information includes a first group identifier and a first group policy identifier. The first group identifier indicates a user group to which the first user equipment belongs. The first group policy identifier indicates a specific interworking policy.

In still another possible implementation of the second aspect, that the second network device determines, based on the first group information and the determining result of whether the second network device includes the second user group corresponding to the information about the second user equipment, the forwarding policy for forwarding the first service packet to the second user equipment includes: the second network device determines a second group policy based on the determining result, where the second group policy indicates an interworking policy that is determined by the second network device based on the second user group and that is for transmitting the first service packet between the first user equipment and the second user equipment; and the second network device determines, according to the second group policy and the interworking policy that is indicated by the first group policy identifier, the forwarding policy for forwarding the first service packet to the second user equipment.

In still another possible implementation of the second aspect, that the second network device determines, according to the second group policy and the interworking policy that is indicated by the first group policy identifier, the forwarding policy for forwarding the first service packet to the second user equipment includes: the second network device determines that a value of a first identifier in the first group policy identifier is valid, where the first identifier indicates that the first network device includes the first user group and the second network device does not include the second user group; the second network device determines a first subpolicy in the second group policy based on the first identifier, where the first subpolicy indicates an interworking policy that is determined by the second user group when the first network device includes the first user group and the second network device does not include the second user group; and the second network device determines, according to the first subpolicy and an interworking policy that is indicated by a value of the first identifier, the forwarding policy for forwarding the first service packet to the second user equipment.

In still another possible implementation of the second aspect, that the second network device determines, according to the second group policy and the interworking policy that is indicated by the first group policy identifier, the forwarding policy for forwarding the first service packet to the second user equipment includes: the second network device determines that values of a second identifier and a third identifier in the first group policy identifier are valid, where the second identifier indicates that the first network device does not include the first user group and the second network device includes the second user group, and the third identifier indicates that the first network device does not include the first user group and the second network device does not include the second user group; the second network device determines a second subpolicy in the second group policy based on the second identifier and the third identifier, where the second subpolicy indicates an interworking policy that is determined by the second user group when the first network device does not include the first user group and the second network device includes the second user group; and the second network device determines, according to the second subpolicy and an interworking policy that is indicated by a value of the second identifier, the forwarding policy for forwarding the first service packet to the second user equipment.

In still another possible implementation of the second aspect, that the second network device determines, based on the first group information and the determining result of whether the second network device includes the second user group corresponding to the information about the second user equipment, the forwarding policy for forwarding the first service packet to the second user equipment includes: the second network device determines a second group policy based on the determining result, where the second group policy indicates an interworking policy that is determined by the second network device based on the second user group and that is for transmitting the first service packet between the first user equipment and the second user equipment; and the second network device determines, based on the first group identifier and according to the second group policy and the interworking policy that is indicated by the first group policy identifier, the forwarding policy for forwarding the first service packet to the second user equipment.

In still another possible implementation of the second aspect, the forwarding policy is any one of the following forwarding policies: forwarding, dropping, forwarding in a random drop manner, and forwarding in a rate-limited forwarding manner.

In the first aspect or the second aspect, optionally, the first group information is carried in any one of the following headers included in the first SRv6 packet: an IPv6 header, a hop-by-hop options header, a destination options header, and a segment routing header.

In the first aspect or the second aspect, optionally, the first group identifier is carried in any one of the following headers included in the first SRv6 packet: an IPv6 header, a hop-by-hop options header, a destination options header, and a segment routing header.

In the first aspect or the second aspect, optionally, the first group policy identifier is carried in any one of the following headers included in the first SRv6 packet: an IPv6 header, a hop-by-hop options header, a destination options header, and a segment routing header.

In the first aspect or the second aspect, optionally, the first SRv6 packet is transmitted through an SRv6 tunnel between the first network device and the second network device.

In the first aspect or the second aspect, optionally, the information about the second user equipment is a destination IP address included in the first service packet, or the information about the second user equipment is a destination MAC address included in the first service packet.

In the first aspect or the second aspect, optionally, the information about the first user equipment is a source IP address included in the first service packet, or the information about the first user equipment is a source MAC address included in the first service packet.

According to a third aspect, a first network device is provided. The first network device has a function of implementing behavior of the first network device in the foregoing method. The function may be implemented based on hardware, or may be implemented based on hardware executing corresponding software. The hardware or the software includes one or more modules corresponding to the foregoing function.

In a possible design, a structure of the first network device includes a processor and an interface. The processor is configured to support the first network device in performing a corresponding function in the foregoing method. The interface is configured to: support communication between the first network device and another network device, and receive information or instructions in the foregoing method from the another network device. The interface is further configured to support communication between the first network device and user equipment. The first network device may further include a memory. The memory is configured to be coupled to the processor, and store program instructions and data that are required for the first network device.

In another possible design, the first network device includes a processor, a transmitter, a receiver, a random access memory, a read-only memory, and a bus. The processor is coupled to the transmitter, the receiver, the random access memory, and the read-only memory through the bus. When the first network device needs to be run, a basic input/output system built into the read-only memory or bootloader in an embedded system in the read-only memory is used to boot a system to start, to boot the first network device to enter a normal running state. After the first network device enters the normal running state, an application program and an action system are run in the random access memory, to enable the processor to perform the method in any one of the first aspect or the possible implementations of the first aspect.

According to a fourth aspect, a first network device is provided. The first network device includes a main control board and an interface board, and may further include a switching board. The first network device is configured to perform the method in any one of the first aspect or the possible implementations of the first aspect. Specifically, the first network device includes modules configured to perform the method in any one of the first aspect or the possible implementations of the first aspect.

According to a fifth aspect, a first network device is provided. The first network device includes a controller and a first forwarding subdevice. The first forwarding subdevice includes an interface board, and may further include a switching board. The first forwarding subdevice is configured to perform a function of the interface board in the fourth aspect, and may further perform a function of the switching board in the fourth aspect. The controller includes a receiver, a processor, a transmitter, a random access memory, a read-only memory, and a bus. The processor is coupled to the receiver, the transmitter, the random access memory, and the read-only memory through the bus. When the controller needs to be run, a basic input/output system built into the read-only memory or bootloader in an embedded system in the read-only memory is used to boot a system to start, to boot the controller to enter a normal running state. After the controller enters the normal running state, an application program and an action system are run in the random access memory, to enable the processor to implement functions of the main control board in the fourth aspect.

According to a sixth aspect, a computer storage medium is provided. The computer storage medium is configured to store a program, code, or instructions used by the foregoing first network device. When executing the program, the code, or the instructions, a processor or a hardware device may complete functions or steps of the first network device in the first aspect.

According to a seventh aspect, a second network device is provided. The second network device has a function of implementing behavior of the second network device in the foregoing method. The function may be implemented based on hardware, or may be implemented based on hardware executing corresponding software. The hardware or the software includes one or more modules corresponding to the foregoing function.

In a possible design, a structure of the second network device includes a processor and an interface. The processor is configured to support the second network device in performing a corresponding function in the foregoing method. The interface is configured to: support communication between the second network device and a first network device; and send information or instructions in the foregoing method to the first network device, or receive information or instructions in the foregoing method that are sent by the first network device. The second network device may further include a memory. The memory is configured to be coupled to the processor, and store program instructions and data that are required for the second network device.

In another possible design, the second network device includes a processor, a transmitter, a receiver, a random access memory, a read-only memory, and a bus. The processor is coupled to the transmitter, the receiver, the random access memory, and the read-only memory through the bus. When the second network device needs to be run, a basic input/output system built into the read-only memory or bootloader in an embedded system in the read-only memory is used to boot a system to start, to boot the second network device to enter a normal running state. After the second network device enters the normal running state, an application program and an action system are run in the random access memory, to enable the processor to perform the method in any one of the second aspect or the possible implementations of the second aspect.

According to an eighth aspect, a second network device is provided. The second network device includes a main control board and an interface board, and may further include a switching board. The second network device is configured to perform the method in any one of the second aspect or the possible implementations of the second aspect. Specifically, the second network device includes a module configured to perform the method in any one of the second aspect or the possible implementations of the second aspect.

According to a ninth aspect, a second network device is provided. The second network device includes a controller and a second forwarding subdevice. The second forwarding subdevice includes an interface board, and may further include a switching board. The second forwarding subdevice is configured to perform a function of the interface board in the eighth aspect, and may further perform a function of the switching board in the eighth aspect. The controller includes a receiver, a processor, a transmitter, a random access memory, a read-only memory, and a bus. The processor is coupled to the receiver, the transmitter, the random access memory, and the read-only memory through the bus. When the controller needs to be run, a basic input/output system built into the read-only memory or bootloader in an embedded system in the read-only memory is used to boot a system to start, to boot the controller to enter a normal running state. After the controller enters the normal running state, an application program and an action system are run in the random access memory, to enable the processor to implement functions of the main control board in the eighth aspect.

According to a tenth aspect, a computer storage medium is provided. The computer storage medium is configured to store a program, code, or instructions used by the foregoing second network device. When executing the program, the code, or the instructions, a processor or a hardware device may complete functions or steps of the second network device in the foregoing second aspect.

According to an eleventh aspect, a network system is provided. The network system includes a first network device and a second network device. The first network device is the first network device in the third aspect, the fourth aspect, or the fifth aspect, and the second network device is the second network device in the seventh aspect, the eighth aspect, or the ninth aspect.

According to the foregoing solution, an SRv6 packet transmitted between the first network device and the second network device carries group information, so that the second network device serving as a receiving end device may control a forwarding policy of a user group according to an interworking policy determined by a transmitting end device and an interworking policy determined by the receiving end device.

DESCRIPTION OF EMBODIMENTS

The following describes the technical solutions of this disclosure in detail by using specific embodiments.

Figure 1:
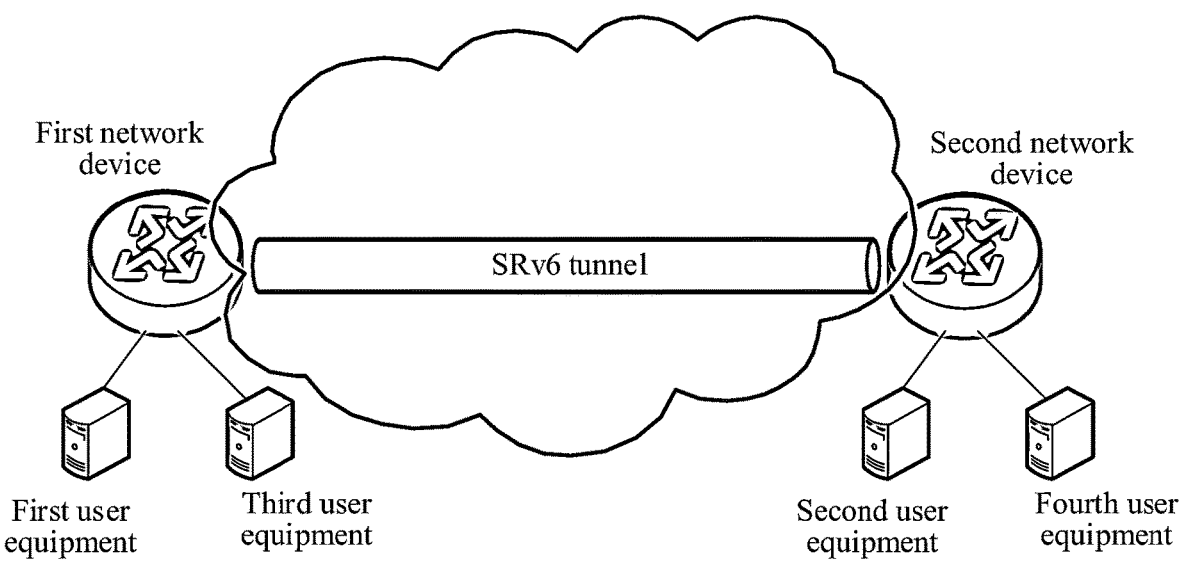
FIG. 1 is a schematic diagram of a structure of a communication network according to an embodiment of this disclosure.

FIG. 1 is a schematic diagram of a structure of a communication network according to an embodiment of this disclosure. The communication network includes a plurality of network devices. The communication network may be, for example, an IP network. Specifically, the communication network may be an SRv6-based communication network, to be specific, the communication network may transmit and process an SRv6 packet. For example, as shown in FIG. 1, the communication network includes a first network device and a second network device. The first network device communicates with the second network device through a communication link. In a possible implementation, the communication link between the first network device and the second network device is a physical communication link. The physical communication link may be a cable, an optical fiber, or a wireless link. A port connecting the first network device to the communication link may be a physical port, and a port connecting the second network device to the communication link may be a physical port. In another possible implementation, the communication link between the first network device and the second network device is a direct link. The direct link means that two devices (for example, the first network device and the second network device) are directly connected through a link, and the link between the two devices does not include another forwarding device or processing device but may include a transparent transmission device. The first network device may be a router or a layer-3 switch. The second network device may be a router or a layer-3 switch. In different types of communication networks, roles of the first network device and the second network device may be different. For example, in a campus network, the first network device and the second network device may be edge switches. For another example, in a core network, the first network device and the second network device may be provider edge (PE) devices.

The first network device may be connected to at least one user equipment. As shown in FIG. 1, the first network device is connected to first user equipment and third user equipment. Similarly, the second network device may be connected to at least one user equipment. As shown in FIG. 1, the second network device is connected to second user equipment and fourth user equipment. A link relationship between the first network device and the first user equipment and a link relationship between the first network device and the third user equipment are used as an example for description. In a possible implementation, a communication link between the first network device and the first user equipment and a communication link between the first network device and the third user equipment are physical communication links. The physical communication link may be a cable, an optical fiber, or a wireless link. A port connecting the first network device to the communication link may be a physical port, and ports connecting the first user equipment and the third user equipment to the communication link may be physical ports. In another possible implementation, the communication link between the first network device and the first user equipment and the communication link between the first network device and the third user equipment are direct links. In addition, the communication link between the first network device and the first user equipment may include another network device, for example, a customer edge (CE) device. Similarly, the communication link between the first network device and the third user equipment may also include another network device. In an implementation of this disclosure, a specific form of the user equipment in FIG. 1 is not limited. For example, the user equipment in FIG. 1 may be a network device used in a home network or a public network, for example, terminal devices such as a mobile phone, a personal computer, and a PAD. For another example, the user equipment in FIG. 1 may be a computer or a server in an enterprise network.

As shown in FIG. 1, the communication network may be an SRv6-based communication network. The first network device may send an SRv6 packet to the second network device. Specifically, the first network device receives a service packet from the first user equipment or the third user equipment. In addition, the first network device encapsulates the service packet into an SRv6 packet. Then, the first network device sends the SRv6 packet to the second network device. In a possible implementation, an SRv6 tunnel is included between the first network device and the second network device. The first network device sends the SRv6 packet to the second network device through the SRv6 tunnel. The second network device receives the SRv6 packet, and decapsulates the SRv6 packet to obtain the service packet. Then, the second network device forwards the service packet to the second user equipment or the fourth user equipment.

However, in an existing SRv6-based communication network, data forwarding based on a user group and a group policy is not supported for SRv6 traffic. Further, in the existing SRv6-based communication network, an implementation solution in which a transmitting end and a receiving end of SRv6 traffic jointly determine a forwarding policy for the user group cannot be implemented.

In a related technology, a group policy identifier is carried in a virtual extensible local area network (VXLAN) packet. For example, refer to IETF drafts: Generic Protocol Extension for VXLAN (draft-ietf-nvo3-vxlan-gpe-10) and Group Policy Encoding with VXLAN-GPE and LISP-GPE (draft-lemon-vxlan-lisp-gpe-gbp-02). An implementation of the drafts may be referred to as generic protocol extension for virtual extensible local area network (VXLAN-GPE). A VXLAN-GPE packet carries a generic protocol extension (GPE) header, and the GPE header includes group policy identifier information. In addition, a reserved field in a VXLAN header of the VXLAN-GPE packet is set, to indicate that the VXLAN-GPE packet includes the GPE header. A transmitting end device and a receiving end device implement isolation between user equipment by transmitting the VXLAN-GPE packet. VXLAN-GPE is implemented in a way similar to that of an access control list (ACL). Compared with ACL, the implementation of VXLAN-GPE reduces workload of rule configuration.

However, VXLAN-GPE can be implemented only in a VXLAN-based network scenario. In addition, the existing VXLAN protocol needs to be reconstructed and existing network devices need to be upgraded. However, according to VXLAN basic protocol IETF request for comments (RFC) 7348 (for example, referring to Chapter 5 in RFC 7348), remaining seven bits (specified as "R") are a reserved field, need to be set to 0 during transmission, and are ignored during reception. Therefore, in a VXLAN network scenario, in order to comply with a stipulation of RFC 7348, a network device may drop a VXLAN-GPE packet because a reserved field in a VXLAN header of the VXLAN-GPE packet is set to a non-zero value, and a GPE header may not be identified. Further, the foregoing drafts merely disclose how to carry a group policy identifier in an existing VXLAN packet, to implement isolation of user equipment. However, the foregoing drafts do not disclose a specific implementation of a group policy, and this cannot implement an implementation solution in which a transmitting end and a receiving end of data traffic jointly determine a forwarding policy for a user group.

To resolve the foregoing problem, this disclosure provides a corresponding solution. In FIG. 1, the first network device receives the service packet from the first user equipment. The first network device determines, based on information that is about the source user equipment and that is carried in the service packet, a user group to which the first user equipment belongs. In addition, the first network device determines group information corresponding to the service packet. The group information indicates an interworking policy that is determined by the first network device based on the user group and that is for transmitting the service packet between the first user equipment and the second user equipment. The second user equipment is a destination of the service packet. The first network device encapsulates the service packet to obtain the SRv6 packet, and the SRv6 packet further includes the group information. The first network device sends the SRv6 packet to the second network device based on the determined group information. Therefore, in the foregoing implementation, the SRv6 packet carries the group information, so that the first network device serving as a transmitting end device may participate in control of determining the forwarding policy for the user group.

For the receiving end device, after receiving the SRv6 packet, the second network device decapsulates the SRv6 packet. The second network device determines, based on information about the destination user equipment of the service packet, a user group to which the second user equipment belongs. Then, the second network device determines, based on the user group to which the second user equipment belongs, an interworking policy for transmitting the service packet between the first user equipment and the second user equipment. Correspondingly, the second network device may learn of, based on the group information carried in the service packet, the interworking policy that is determined by the first network device based on the user group and that is for transmitting the service packet between the first user equipment and the second user equipment. In this way, the second network device determines, according to the interworking policy determined by the first network device (the transmitting end) and the interworking policy determined by the second network device (the receiving end), a forwarding policy for forwarding the service packet to the second user equipment. Therefore, in the foregoing implementation, the SRv6 packet carries the group information, so that the second network device serving as the receiving end device can control the forwarding policy of the user group according to the interworking policy determined by the transmitting end device and the interworking policy determined by the receiving end device.

Figure 2:
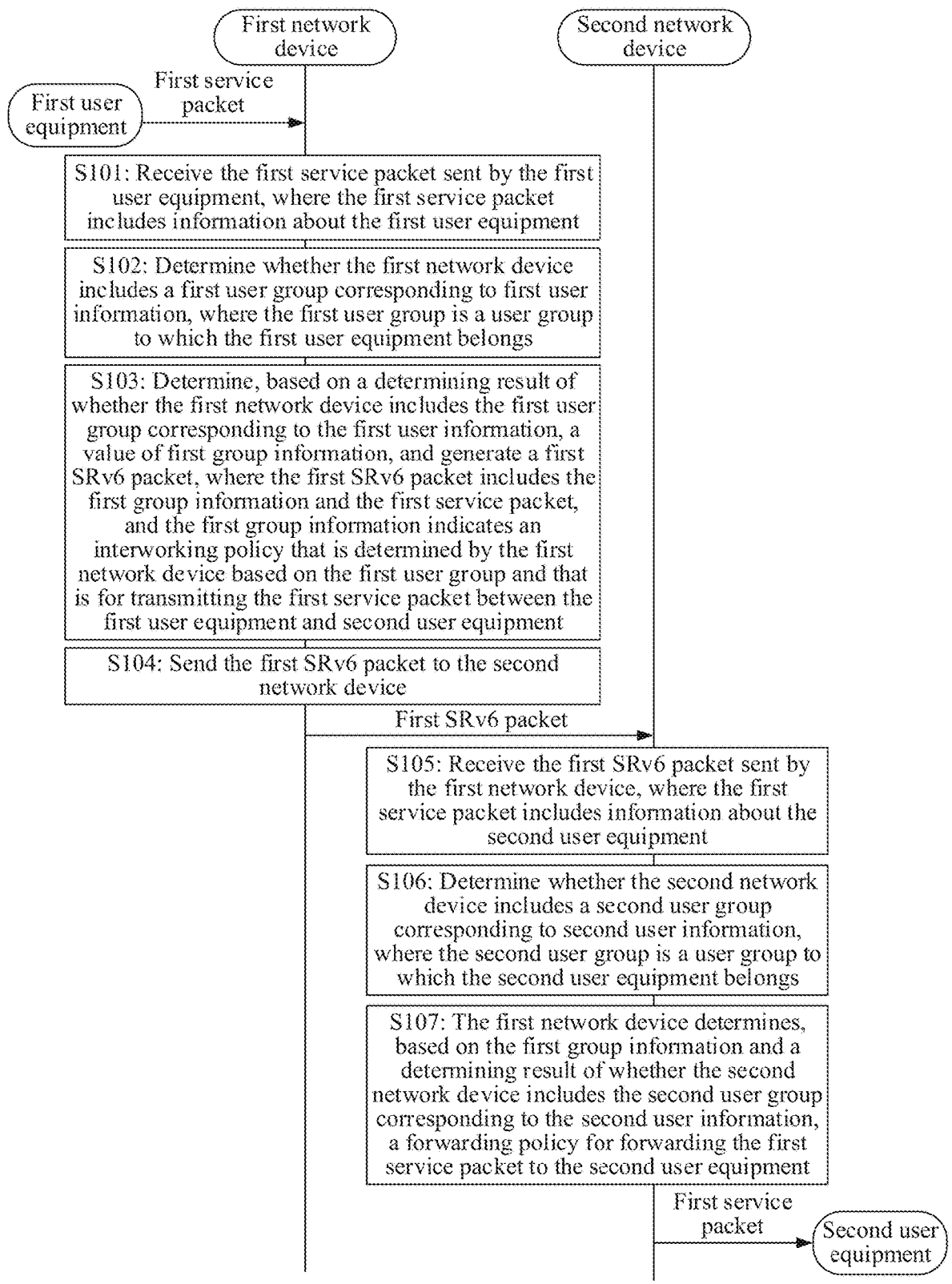
FIG. 2 is a flowchart of a packet forwarding method according to an embodiment of this disclosure.

FIG. 2 is a flowchart of a packet forwarding method according to an embodiment of this disclosure. The method shown in FIG. 2 may be applied to the structure of the network shown in FIG. 1. In this implementation of this disclosure, interaction between the first network device and the second network device in FIG. 1 is described. It can be understood that another network device may be included on a communication link between the first network device and the second network device. Specifically, the method includes the following steps.

S101: The first network device receives a first service packet sent by the first user equipment, where the first service packet includes information about the first user equipment.

As shown in FIG. 1, the first network device communicates with the first user equipment. In a possible implementation, another network device is included on a communication link between the first network device and the first user equipment. The first user equipment generates the first service packet. An encapsulation format of the first service packet is not limited in this implementation of this disclosure. For example, the first service packet may be a layer 2 Ethernet frame. For another example, the first service packet may be an IP packet.

The first service packet includes the information about the first user equipment. The information about the first user equipment indicates the first user equipment. In a possible implementation, the information about the first user equipment is address information. Specifically, the information about the first user equipment includes a media access control (MAC) address or an IP address. The first user equipment is a transmitting end device of the first service packet. Therefore, the MAC address included in the information about the first user equipment is a source MAC address of the first service packet, and the IP address included in the information about the first user equipment is a source IP address of the first service packet.

The first service packet may further include information about the second user equipment. As shown in FIG. 1, the first service packet sent by the first user equipment is sent to the second user equipment. In this case, the information about the second user equipment indicates the second user equipment. In a possible implementation, the information about the second user equipment is address information. Specifically, the information about the second user equipment includes a MAC address or an IP address. The second user equipment is a receiving end device of the first service packet. Therefore, the MAC address included in the information about the second user equipment is a destination MAC address of the first service packet, and the IP address included in the information about the second user equipment is a destination IP address of the first service packet.

The first service packet includes a packet header and a payload. The packet header in the first service packet carries the information about the first user equipment and the information about the second user equipment. The payload in the first service packet is service data that the first user equipment expects to send to the second user equipment. The first network device receives the first service packet sent by the first user equipment. In an actual service scenario, the first network device receives a service flow sent by the first user equipment. The service flow includes a plurality of service packets. The first service packet may be understood as any one or more of the service packets in the service flow. Therefore, this implementation of this disclosure may be understood as an implementation of forwarding on a data flow from user equipment based on a group policy and a user group.

S102: The first network device determines whether the first network device includes a first user group corresponding to the information about the first user equipment, where the first user group is a user group to which the first user equipment belongs.

S103: The first network device determines, based on a determining result of whether the first network device includes the first user group corresponding to the information about the first user equipment, a value of first group information, and generates a first SRv6 packet, where the first SRv6 packet includes the first group information and the first service packet, and the first group information indicates an interworking policy that is determined by the first network device based on the first user group and that is for transmitting the first service packet between the first user equipment and the second user equipment.

The first network device receives the first service packet sent by the first user equipment. After receiving the first service packet, the first network device parses the first service packet, and obtains the information about the first user equipment in the first service packet. The first network device determines whether the first network device includes the first user group corresponding to the information about the first user equipment. The first user group is a user group to which the first user equipment belongs. In other words, the user group is an implementation of user equipment isolation. For example, the first network device is connected to user equipment 1, user equipment 2, user equipment 3, and user equipment 4. The user equipment 1 and the user equipment 2 belong to a user group 1, the user equipment 3 belongs to a user group 2, and the user equipment 4 belongs to a user group 3. Therefore, one user group may include one or more user equipments. The first network device may determine, based on information in a service packet received from the user equipment, a specific user group to which the user equipment sending the service packet belongs.

During specific implementation, the first network device may store at least one entry, and each of the at least one entry includes a correspondence between information about user equipment and a user group. The information about the user equipment is information about the user equipment that sends a service packet, for example, a source MAC address or a source IP address. For ease of description, information about user equipment in Table 1 is referred to as information about source user equipment, the user equipment in Table 1 is referred to as the source user equipment, and a user group in Table 1 is referred to as a source user group. As shown in Table 1, the information about the first user equipment corresponds to the first user group, indicating that the first user equipment belongs to the first user group; and information about the third user equipment corresponds to a third user group, indicating that the third user equipment belongs to the third user group. It is to be noted that a representation manner of Table 1 is to clearly show a user group to which the source user equipment belongs. During implementation, an entry stored in the first network device may not include the first column of information (source user equipment) in Table 1.

TABLE 1

| Source user equipment | Information about the source user equipment | Source user group |
|---|---|---|
| First user equipment | Information about the first user equipment | First user group |
| Third user equipment | Information about the third user equipment | Third user group |
| User equipment 1 | Information about the user equipment 1 | First user group |
| User equipment 4 | Information about the user equipment 4 | Third user group |
| . . . | . . . | . . . |

After obtaining the information about the first user equipment in the first service packet, the first network device queries, based on the information about the first user equipment, the at least one entry (as shown in Table 1) stored in the first network device. The first network device determines, based on a correspondence between the information about the first user equipment and the first user group, that a user group corresponding to the information about the first user equipment is the first user group. Therefore, the first network device may determine that the first user equipment belongs to the first user group.

In a possible implementation, the source user group in Table 1 may be represented in a form of a group identifier. For example, the first user group may be represented by a group identifier Group_ID_1, and the third user group may be represented by a group identifier Group_ID_3. In a possible implementation, the group identifier may be represented by 16-bit data. Correspondingly, when storing the entry shown in Table 1, the first network device may store the group identifier as the source user group. Therefore, that the group identifier indicates the user group may alternatively be understood as that the group identifier indicates a user group to which the user equipment belongs.

The first network device may generate the first SRv6 packet based on the received first service packet. The first SRv6 packet is a packet obtained by encapsulating the first service packet. The first service packet may be encapsulated in the first SRv6 packet as the payload. The first SRv6 packet further includes the first group information. The first group information indicates the interworking policy that is determined by the first network device based on the first user group and that is for transmitting the first service packet between the first user equipment and the second user equipment. The first group information indicates that the first network device determines an interworking policy between the first network device and the second network device for the first service packet that belongs to the first user group. The interworking policy determined by the first network device is a forwarding policy expected by the first network device. In other words, the first network device expects that after receiving the first service packet, the second network device forwards the first service packet to the destination of the first service packet according to a rule of the interworking policy provided by the first network device. For example, the first network device determines a value of the first group information, to indicate that the first service packet can be forwarded by the second network device to the second user equipment after reaching the second network device. For another example, the first network device determines a value of the first group information, to indicate that the first service packet can be dropped (not forwarded to the second user equipment) by the second network device after reaching the second network device. Therefore, the first group information is determined by the first network device, and affects whether the first service packet can be forwarded to the second user equipment.

In a possible implementation, the first group information includes a first group identifier.

For example, the first group identifier is used as the first group information. The first network device determines, based on the entry shown in Table 1, that the first user equipment sending the first service packet belongs to the first user group. The first user group is represented by the first group identifier. Therefore, the first group identifier indicates that the first user equipment belongs to the first user group. The first network device determines the value of the first group information as the first group identifier, and the first network device generates the first SRv6 packet that includes the first group information. It may be understood that, when the value of the first group information is the first group identifier, an indicated specific interworking policy is: The first network device forwards the first service packet and expects the second network device to forward the first service packet to the second user equipment.

For example, the first network device may fail to find a corresponding user based on a received service packet. For example, the first network device cannot find, based on the first service packet, a corresponding user group from the entry shown in Table 1. This indicates that the first user equipment does not belong to any user group. In this case, the first network device determines a value of the first group identifier as an invalid value. For example, the value is set to all 0s. Correspondingly, the value of the first group information is indicated as an invalid value, that is, all 0s. Then, the first network device generates the first SRv6 packet that includes the first group information (invalid value). It may be understood that, when the value of the first group information is "invalid", an indicated specific interworking policy is: The first network device forwards the first service packet and expects the second network device to drop the first service packet.

Figures 3, 4:
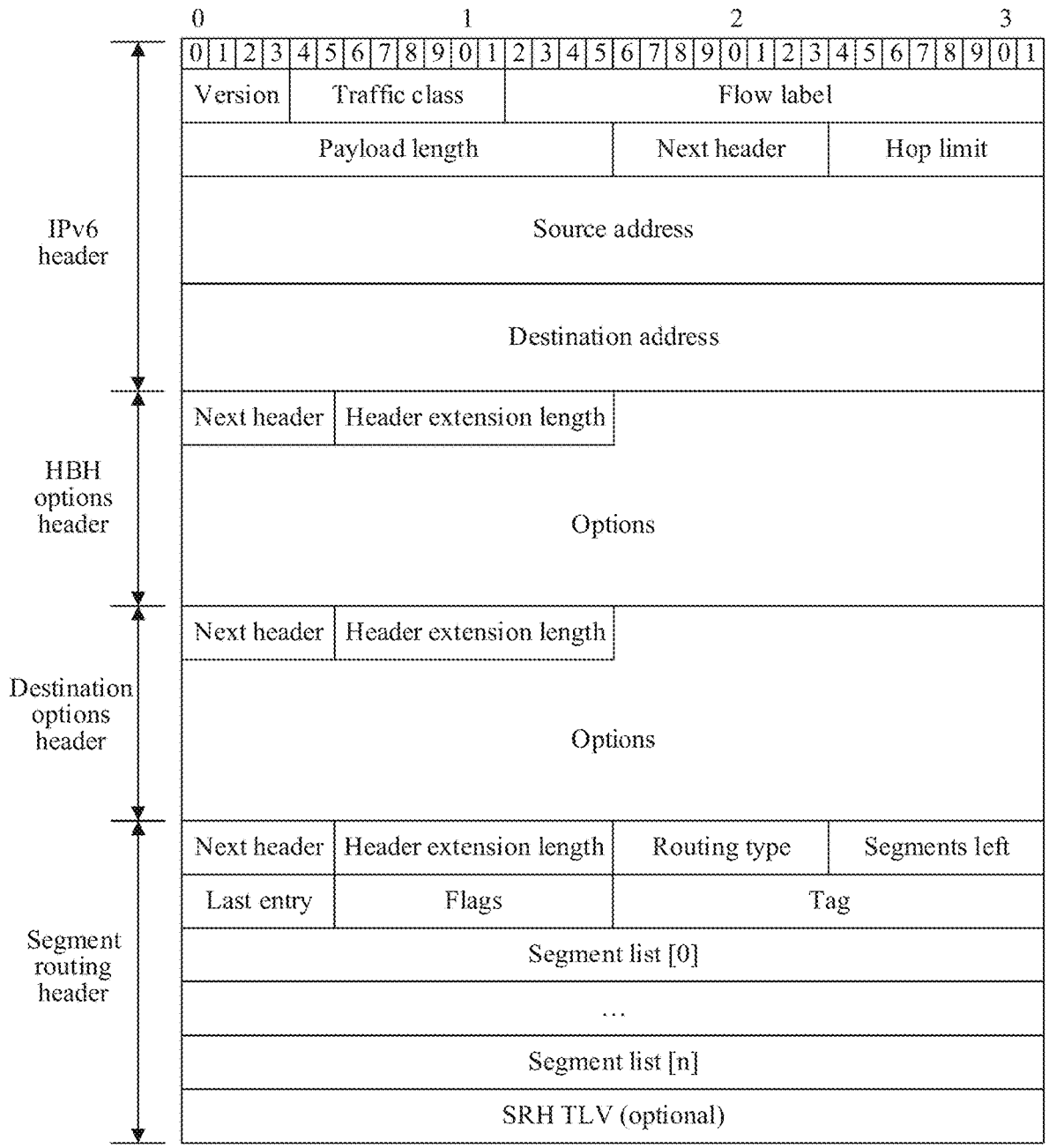
FIG. 3 shows a format of group information according to an embodiment of this disclosure.
FIG. 4 shows a header format of an SRv6 packet according to an embodiment of this disclosure.

In another possible implementation, the first group information includes the first group identifier and a first group policy identifier. FIG. 3 shows a format of group information. The group information in FIG. 3 includes a group identifier and a group policy identifier. For example, a total length of the group information is 16 bits, where three high-order bits represent the group policy identifier, and the remaining 13 bits represent the group identifier. FIG. 3 shows an implementation in which the group identifier and the group policy identifier are in a same field. It can be understood that the group identifier and the group policy identifier may be set to be in different fields in an implementation. With reference to the foregoing descriptions, the first group identifier in the first group information indicates a user group to which the first user equipment belongs, and the first group policy identifier in the first group information indicates a specific interworking policy. In other words, the first group policy identifier indicates a specific interworking policy that is determined by the first network device based on the first user group and that is for transmitting the first service packet between the first user equipment and the second user equipment. In an actual scenario, according to the foregoing implementation, the first network device may determine, based on the information about the first user equipment in the first service packet, that the first user equipment belongs to the first user group, to determine the value of the first group identifier. Then, the first network device determines a value of the first group policy identifier according to the interworking policy stored in the first network device and the first group identifier. Therefore, the first network device can determine the value of the first group information, so that the first network device can determine, based on the first user group, the interworking policy for transmitting the first service packet between the first user equipment and the second user equipment.

For example, the first group information includes the first group identifier and the first group policy identifier, and the first group policy identifier includes a first identifier. The first identifier indicates that the first network device includes the first user group and the second network device does not include a second user group. The second user group is a user group to which the second user equipment belongs. The second user equipment is user equipment that receives the first service packet. With reference to the foregoing descriptions, the first network device determines, based on the first service packet, that the first user equipment matches the first user group. The first network device indicates the first group identifier in the first group information as the first user group, and the first network device determines a specific interworking policy based on a result indicating that the first user equipment can match the first user group. According to the foregoing descriptions, a total length of the group information is 16 bits, where three high-order bits represent a group policy identifier. Specifically, the $1^{st}$ bit (for example, the highest bit in three high-order bits) represents the first identifier. A meaning of the first identifier is: "Source user equipment has a user group, and destination user equipment has no user group". Because the first network device determines that the first user equipment can match the first user group, the first network device enables the first identifier (the $1^{st}$ bit) to be valid. Further, the first network device may set a value of the first identifier according to a locally stored interworking policy. The value of the first identifier indicates a forwarding policy that the first network device expects the second network device to use on the first service packet. For example, if the value of the first identifier is 1, it indicates that the first network device expects the second network device to forward the first service packet to the second user equipment. For another example, if the value of the first identifier is 0, it indicates that the first network device expects the second network device to drop the first service packet.

For example, the first group information includes the first group identifier and the first group policy identifier, and the first group policy identifier includes a second identifier and a third identifier. The second identifier indicates that the first network device does not include the first user group and the second network device includes a second user group. The third identifier indicates that the first network device does not include the first user group and the second network device does not include the second user group. With reference to the foregoing descriptions, the first network device determines, based on the first service packet, that no user group that can match the first user equipment exists in the entry stored in the first network device. The first network device indicates the first group identifier in the first group information as "invalid", and the first network device determines a specific interworking policy based on a result indicating that the first user equipment does not match a user group. According to the foregoing descriptions, a total length of the group information is 16 bits, where three high-order bits represent a group policy identifier. Specifically, the $2^{nd}$ bit (for example, the second highest bit in three high-order bits) represents the second identifier, and the $3^{rd}$ bit represents the third identifier. A meaning of the second identifier is: "Source user equipment has no user group, and destination user equipment has a user group". A meaning of the third identifier is: "Source user equipment has no user group, and destination user equipment has no user group". Because the first network device determines that the first user equipment does not match a user group, and the first network device does not know whether a user group can be matched after the second network device receives the first service packet, the first network device enables the second identifier (the $2^{nd}$ bit) and the third identifier (the $3^{rd}$ bit) to be valid. Further, the first network device may set a value of the second identifier and a value of the third identifier according to a locally stored interworking policy. The value of the second identifier indicates a forwarding policy that the first network device expects the second network device to use on the first service packet. The value of the third identifier indicates a forwarding policy that the first network device expects the second network device to use on the first service packet. For example, if the value of the second identifier is 1 and the value of the third identifier is 0, it indicates that the first network device expects the second network device to forward the first service packet to the second user equipment when a user group is matched based on the first service packet, and the first network device expects the second network device to drop the first service packet when no user group is matched based on the first service packet. For another example, if the value of the second identifier is 0 and the value of the third identifier is 1, it indicates that the first network device expects the second network device to drop the first service packet when a user group is matched based on the first service packet, and the first network device expects the second network device to forward the first service packet to the second user equipment when no user group is matched based on the first service packet.

In the foregoing implementation, the first group policy identifier indicates a situation in which the first network device matches a user group based on the first service packet, and further indicates a situation in which the second network device matches a user group based on the service packet. In this way, after obtaining the first service packet, the second network device may learn of, by parsing the first group policy identifier in the first group information, an interworking policy configured by the first network device. Therefore, the second network device does not need to parse the first group identifier in the first group information. In this way, a processing speed of the second network device for the first service packet is improved.

In still another possible implementation, the first group information includes the first group identifier and a first group policy identifier. The first group policy identifier indicates a situation in which the second network device matches a user group based on the service packet, but does not indicate a situation in which the first network device matches a user group based on the first service packet.

For example, the first group policy identifier includes a fourth identifier. For an implementation of the fourth identifier, refer to the foregoing implementation of the first identifier. Different from the first identifier, the fourth identifier indicates that the second network device does not include a second user group, and the fourth identifier does not indicate the situation in which the first network device matches a user group based on the first service packet. A meaning of the fourth identifier is: "Destination user equipment has no user group". In this way, a meaning indicated by both the first group identifier and the fourth identifier is: "Source user equipment has a user group, and destination user equipment has no user group".

For example, the first group policy identifier includes a fifth identifier and a sixth identifier. For an implementation of the fifth identifier, refer to the foregoing implementation of the second identifier. Different from the second identifier, the fifth identifier indicates that the second network device includes a second user group, and the fifth identifier does not indicate the situation in which the first network device matches a user group based on the first service packet. A meaning of the fifth identifier is: "Destination user equipment has a user group". In this way, a meaning indicated by both the first group identifier and the fifth identifier is: "Source user equipment has no user group, and destination user equipment has a user group". Correspondingly, for an implementation of the sixth identifier, refer to the foregoing implementation of the third identifier. Different from the third identifier, the sixth identifier indicates that the second network device does not include a second user group, and the sixth identifier does not indicate the situation in which the first network device matches a user group based on the first service packet. A meaning of the sixth identifier is: "Destination user equipment has no user group". In this way, a meaning indicated by both the first group identifier and the sixth identifier is: "Source user equipment has no user group, and destination user equipment has no user group".

In the foregoing implementation, after obtaining the first service packet, the second network device may learn of, by parsing the first group identifier and the first group policy identifier in the first group information, an interworking policy configured by the first network device.

With reference to the foregoing descriptions, the first group information is carried in the first SRv6 packet. The first SRv6 packet is a packet obtained through encapsulating the first service packet by the first network device. FIG. 4 shows a header format of an SRv6 packet according to an embodiment of this disclosure. As shown in FIG. 4, an SRv6 header includes an IPv6 header and a segment routing header. Optionally, the SRv6 header may further include a hop-by-hop options header and/or a destination options header. In this application, the segment routing header may be represented by an SRH, and the hop-by-hop options header may be represented by an HBH options header. The first group information may be carried in the IPv6 header; or the first group information may be carried in the HBH options header; or the first group information may be carried in the destination options header; or the first group information may be carried in the SRH. In a possible implementation, the first group information includes the first group identifier. Therefore, the first group identifier may be carried in the IPv6 header, the HBH options header, the destination options header, or the SRH. In another possible implementation, the first group information includes the first group identifier and the first group policy identifier. Therefore, the first group identifier and the first group policy identifier may be carried in the IPv6 header, the HBH options header, the destination options header, or the SRH. In addition, the first group identifier and the first group policy identifier may be carried in a same field, as shown in FIG. 3. The first group identifier and the first group policy identifier may alternatively be carried in different fields of a same header, or may be carried in different fields of different headers. For example, the first group identifier is carried in the IPv6 header, and the first group policy identifier is carried in the SRH. The following provides specific descriptions by using the first group information as an example.

For example, according to the definition of RFC 8200 (section 3 of RFC 8200), the IPv6 header includes next header information, which may also be referred to as a next header field. If a value of the next header information in the IPv6 header is 0, it indicates that a next header of the IPv6 header is the HBH options header. That the HBH options header is a next header of the IPv6 header is that the HBH options header immediately follows the IPv6 header. Specifically, the HBH header is encapsulated between the IPv6 header and the payload, and is adjacent to the IPv6 header. According to the explanation in section 4.3 of RFC 8200, the HBH options header is processed by a network device of each hop on a path for transmitting the SRv6 packet. Further, the HBH options header includes option information, and the option information is processed by the network device of each hop on the path for transmitting the SRv6 packet. The IPv6 header further includes version information, traffic class information, flow label information, payload length information, hop limit information, source address information, and destination address information. A length of the flow label information is 20 bits. In a possible implementation, the flow label information carries the first group information. Specifically, a part of the length (for example, 16 bits) of the flow label information is used as the first group information. A remaining length (4 bits) of the flow label information maintains an original flow label function. In addition, one flag bit (with a length of 1 bit) may be further set in the traffic class information, and the flag bit indicates that the flow label information includes the first group information.

For example, according to the explanation in section 4.3 of RFC 8200, the HBH options header includes next header information, header extension length (hdr ext len) information, and options. A first option is defined in the options. The first option carries the first group information. Specifically, the first option includes option type information, option data length (opt data len) information, and option data, where the option data carries the first group information. In an implementation in which the HBH options header carries the first group information, the second network device needs to enable a configuration of processing the option. Correspondingly, when there is another network device before the first network device and the second network device, the another network device may not enable the configuration of processing the option. In addition, the flag bit mentioned above may also indicate that the HBH options header includes the first group information.

For example, according to the explanation in section 4.6 of RFC 8200, the destination options header includes next header information, header extension length (hdr ext len) information, and options. A second option is defined in the options. The second option carries the first group information. Specifically, the second option includes option type information, option data length (opt data len) information, and option data, where the option data carries the first group information. In addition, the flag bit mentioned above may also indicate that the destination options header includes the first group information.

For example, according to the explanation in section 2 of RFC 8754, the SRH includes next header information, header extension length (hdr ext len) information, routing type information, segments left information, last entry information, flag, tag information, and segment list information. Optionally, the SRH may further include SRH TLV (type-length-value) information. In a possible implementation, the first group information may be carried in the tag. Further, a part of a length (for example, 16 bits) of the tag may be used as the first group information. A remaining length of the tag maintains an original tag function. In addition, one flag bit (with a length of 1 bit) may be set in the flag, and the flag bit indicates that the SRH includes the first group information. In another possible implementation, the first group information may be carried in the SRH TLV. In still another possible implementation, the first group information may be carried in the segment list information.

S104: The first network device sends the first SRv6 packet to the second network device.

S105: The second network device receives the first SRv6 packet sent by the first network device.

The first network device generates the first SRv6 packet according to the implementations of S102 and S103. The first SRv6 packet includes the first group information and the first service packet. The information about the first user equipment may be a source IP address included in the first service packet, or the information about the first user equipment may be a source MAC address included in the first service packet. In a possible implementation, an SRv6 tunnel is included between the first network device and the second network device. The first network device sends the first SRv6 packet to the second network device through the SRv6 tunnel. The second network device receives the first SRv6 packet. The SRv6 tunnel between the first network device and the second network device may include another network device.

S106: The second network device determines whether the second network device includes the second user group corresponding to the information about the second user equipment, where the second user group is a user group to which the second user equipment belongs.

S107: The second network device determines, based on the first group information and a determining result of whether the second network device includes the second user group corresponding to the information about the second user equipment, a forwarding policy for forwarding the first service packet to the second user equipment.

After receiving the first SRv6 packet, the second network device decapsulates the first SRv6 packet to obtain the first group information and the first service packet. A destination of the first service packet is the second user equipment. As shown in FIG. 1, the second user equipment communicates with the second network device. The first service packet includes the information about the second user equipment. The information about the second user equipment indicates the second user equipment. In a possible implementation, the information about the second user equipment is address information. Specifically, the information about the second user equipment includes a MAC address or an IP address. The second user equipment is a receiving end device of the first service packet. Therefore, the MAC address included in the information about the second user equipment is a destination MAC address of the first service packet, and the IP address included in the information about the second user equipment is a destination IP address of the first service packet.

The second network device determines whether the second network device includes the second user group corresponding to the information about the second user equipment, where the second user group is a user group to which the second user equipment belongs. During specific implementation, as shown in Table 2, the second network device may store at least one entry, and each of the at least one entry includes a correspondence between information about user equipment and a user group. The information about the user equipment is information about the user equipment that receives a service packet, for example, a destination MAC address or a destination IP address. For ease of description, information about user equipment in Table 2 is referred to as information about destination user equipment, user equipment in Table 2 is referred to as destination user equipment, and a user group in Table 2 is referred to as a destination user group. As shown in Table 2, the information about the second user equipment corresponds to the second user group, indicating that the second user equipment belongs to the second user group; and information about fourth user equipment corresponds to a fourth user group, indicating that the fourth user equipment belongs to the fourth user group. It is to be noted that a representation manner of Table 2 is to clearly show a user group to which the destination user equipment belongs. During implementation, an entry stored in the second network device may not include the first column of information (destination user equipment) in Table 2.

TABLE 2

| Destination user equipment | Information about the destination user equipment | Destination user group |
| --- | --- | --- |
| Second user equipment | Information about the second user equipment | Second user group |
| Fourth user equipment | Information about the fourth user equipment | Fourth user group |
| User equipment 2 | Information about the user equipment 2 | Second user group |
| User equipment 3 | Information about the user equipment 3 | Fourth user group |
| . . . | . . . | . . . |

After obtaining the information about the second user equipment in the first service packet, the second network device queries, based on the information about the second user equipment, the at least one entry (as shown in Table 2) stored in the second network device. The second network device determines, based on a correspondence between the information about the second user equipment and the second user group, that a user group corresponding to the information about the second user equipment is the second user group. Therefore, the second network device may determine that the second user equipment belongs to the second user group.

In a possible implementation, the destination user group in Table 2 may be represented in a form of a group identifier. For example, the second user group may be represented by a group identifier header 2, and the fourth user group may be represented by a group identifier Group_ID_4. In a possible implementation, the group identifier may be represented by 16-bit data. Correspondingly, when storing the entry shown in Table 2, the second network device may store the group identifier as the destination user group. Therefore, that the group identifier indicates the user group may alternatively be understood as that the group identifier indicates a user group to which the user equipment belongs.

According to the foregoing descriptions, the first service packet includes the first group information. The first group information indicates the interworking policy that is determined by the first network device based on the first user group and that is for transmitting the first service packet between the first user equipment and the second user equipment. In other words, by parsing the first service packet, the second network device can learn of the interworking policy that is determined by the first network device based on the first user group and that is for transmitting the first service packet between the first user equipment and the second user equipment. Correspondingly, based on the determining result of whether the second network device includes the second user group corresponding to the information about the second user equipment, the second network device determines, based on the second user group, an interworking policy that is for transmitting the first service packet between the first user equipment and the second user equipment. Then, the second network device determines, according to the interworking policy determined by the first network device and the interworking policy determined by the second network device, the forwarding policy for forwarding the first service packet to the second user equipment.

In the foregoing implementation, in a process of determining the forwarding policy for forwarding the first service packet to the second user equipment, the second network device considers both the interworking policy determined by the first network device and the interworking policy determined by the second network device. The interworking policy determined by the first network device indicates that the first network device expects the second network device to forward the first service packet according to the interworking policy determined by the first network device. The interworking policy determined by the second network device indicates an interworking policy determined by the second network device according to a local policy and based on a status of matching between a destination address in the first service packet and a user group. In a possible implementation, the second network device stores at least one entry, and the at least one entry indicates a correspondence between a "source end interworking policy", a "destination end interworking policy", and a "forwarding policy", as shown in Table 3.

TABLE 3

| Source end interworking policy | Destination end interworking policy | Forwarding policy |
|---|---|---|
| Can communicate with each other | Can communicate with each other | Forwarding |
| Can communicate with each other | Cannot communicate with each other | Random dropping |
| Cannot communicate with each other | Can communicate with each other | Rate-limited forwarding |
| Cannot communicate with each other | Cannot communicate with each other | Dropping |

As shown in Table 3, the "source end interworking policy" indicates the interworking policy that is determined by the first network device based on the first user group and that is for transmitting the first service packet between the first user equipment and the second user equipment. For a specific implementation, refer to the foregoing implementation. The interworking policy determined by the first network device can reflect whether the first network device expects the first service packet to be forwarded by the second network device. For example, in an implementation in which the first group information includes the first group identifier, when the value of the first group identifier indicates the first user group, and the first network device expects the first service packet to be forwarded by the second network device, the source end interworking policy is "can communicate with each other". Correspondingly, when the value of the first group identifier indicates an invalid value, and the first network device does not expect the first service packet to be forwarded by the second network device, the source end interworking policy is "cannot communicate with each other". For another example, in an implementation in which the first group information includes the first group identifier and the first group policy identifier, when a value of an identifier included in the first group policy identifier is 1, and the first network device expects the first service packet to be forwarded by the second network device, the source end interworking policy is "can communicate with each other". Correspondingly, when a value of an identifier included in the first group policy identifier is 0, and the first network device does not expect the first service packet to be forwarded by the second network device, the source end interworking policy is "cannot communicate with each other".

As shown in Table 3, the "destination end interworking policy" indicates the interworking policy that is determined by the second network device based on the second user group and that is for transmitting the first service packet between the first user equipment and the second user equipment. The interworking policy determined by the second network device can reflect whether the second network device expects the first service packet to be forwarded by the second network device. In a possible implementation, the second network device determines the interworking policy according to a local policy and based on the second user group. In another possible implementation, the second network device determines the interworking policy according to a local policy and based on the first user group and the second user group. It can be understood that a specific forwarding policy shown in Table 3 is an example.

The following separately provides descriptions based on different implementations of the first group information.

For example, the first group information includes the first group identifier. After receiving the first SRv6 packet, the second network device obtains the first group information in the first SRv6 packet. The second network device determines the source end interworking policy based on the first group identifier included in the first group information. For example, the value of the first group identifier indicates the first user group, and the second network device can determine that the source end interworking policy is "can communicate with each other". For another example, the value of the first group identifier indicates an invalid value, and the second network device can determine that the source end interworking policy is "cannot communicate with each other". The second network device determines, based on the first service packet, whether the second network device includes the second user group corresponding to the information about the second user equipment. If the second network device determines that the second network device includes the second user group corresponding to the information about the second user equipment, the second network device can determine that the destination end interworking policy is "can communicate with each other". If the second network device determines that the second network device does not include the second user group corresponding to the information about the second user equipment, the second network device can determine that the destination end interworking policy is "cannot communicate with each other". After the second network device determines the source end interworking policy and the destination end interworking policy, the second network device can determine, according to the implementation of Table 3, the forwarding policy for forwarding the first service packet to the second user equipment. For example, if the source end interworking policy is "can communicate with each other", and the destination end interworking policy is "can communicate with each other", the forwarding policy determined by the second network device is "forwarding". In other words, the second network device forwards the first service packet to the second user equipment. For another example, if the source end interworking policy is "can communicate with each other", and the destination end interworking policy is "cannot communicate with each other", the forwarding policy determined by the second network device is "random dropping". In other words, the second network device forwards the first service packet to the second user equipment in a random drop manner. The "in a random drop manner" is that the second network device determines, based on a preset random parameter, whether the first service packet is sent to the second user equipment. Therefore, there is a probability that the first service packet is sent to the second user equipment. Similarly, there is a probability that the first service packet is dropped by the second network device.

For example, the first group information includes the first group identifier and the first group policy identifier, and the first group policy identifier includes the first identifier. The first identifier indicates that the first network device includes the first user group and the second network device does not include the second user group. The second network device determines that the second network device does not include the second user group corresponding to the information about the second user equipment. Therefore, the second network device may learn that the first identifier meets a result determined by the second network device. If the value of the first identifier is 1, the second network device determines, based on the value of the first identifier, that the source end interworking policy is "can communicate with each other". If the value of the first identifier is 0, the second network device determines, based on the value of the first identifier, that the source end interworking policy is "cannot communicate with each other". Correspondingly, the second network device may determine the destination end interworking policy according to a local policy and based on a matching status of the second user group. For example, the second network device determines that the information about the second user equipment can match the second user group, and the second network device determines that the destination end interworking policy is "can communicate with each other". For another example, the second network device determines that the information about the second user equipment does not match a user group, and the second network device determines that the destination end interworking policy is "cannot communicate with each other". The second network device may determine the destination end interworking policy according to a local policy and based on a matching status of the second user group and a matching status of the first user group. For example, the first user group can be matched and the second user group cannot be matched, and the second network device determines that the destination end interworking policy is "cannot communicate with each other". For another example, the first user group can be matched and the second user group can be matched, and the second network device determines that the destination end interworking policy is "can communicate with each other". After the second network device determines the source end interworking policy and the destination end interworking policy, the second network device can determine, according to the implementation of Table 3, the forwarding policy for forwarding the first service packet to the second user equipment. For example, if the source end interworking policy is "cannot communicate with each other", and the destination end interworking policy is "cannot communicate with each other", the forwarding policy determined by the second network device is "dropping". In other words, the second network device drops the first service packet. For another example, if the source end interworking policy is "cannot communicate with each other", and the destination end interworking policy is "can communicate with each other", the forwarding policy determined by the second network device is "rate-limited forwarding". In other words, the second network device forwards the first service packet to the second user equipment in a rate-limited forwarding manner. The "in a rate-limited forwarding manner" is that the second network device forwards the first service packet to the second user equipment, and limits a forwarding rate to be not greater than a specified rate.

In the foregoing implementation, an indication identifier corresponding to that the first network device includes the first user group and the second network device includes the second user group is not described. The reason is that in this case, the first network device and the second network device may determine a final forwarding policy based on a group identifier. It can be understood that, in a specific implementation scenario, the foregoing identifier may alternatively be configured, to indicate the first user group and that the second network device includes the second user group. For determining of a specific interworking policy and forwarding policy, refer to the foregoing implementation. Details are not described herein.

For example, the first group information includes the first group identifier and the first group policy identifier, and the first group policy identifier includes the second identifier and the third identifier. The second identifier indicates that the first network device does not include the first user group and the second network device includes the second user group. The third identifier indicates that the first network device does not include the first user group and the second network device does not include the second user group. The second network device determines, based on the first service packet, whether the second network device includes the second user group corresponding to the information about the second user equipment. If the second network device determines that the second network device includes the second user group corresponding to the information about the second user equipment, the second network device determines the source end interworking policy based on the second identifier. If the second network device determines that the second network device does not include the second user group corresponding to the information about the second user equipment, the second network device determines the source end interworking policy based on the third identifier. Further, if the value of the second identifier or the third identifier is 1, the second network device determines, based on the value of the second identifier or the third identifier, that the source end interworking policy is "can communicate with each other". If the value of the second identifier or the third identifier is 0, the second network device determines, based on the value of the second identifier or the third identifier, that the source end interworking policy is "cannot communicate with each other". Correspondingly, the second network device may determine the destination end interworking policy according to a local policy and based on a matching status of the second user group. For a specific implementation, refer to the foregoing implementation. Details are not described herein. After the second network device determines the source end interworking policy and the destination end interworking policy, the second network device can determine, according to the implementation of Table 3, the forwarding policy for forwarding the first service packet to the second user equipment.

For example, the first group information includes the first group identifier and the first group policy identifier, the first group policy identifier includes the fourth identifier, and the fourth identifier indicates that the second network device does not include the second user group. For an implementation of determining the forwarding policy by the second network device, refer to the foregoing implementation related to the first identifier. Details are not described herein.

For example, the first group information includes the first group identifier and the first group policy identifier, the first group policy identifier includes the fifth identifier and the sixth identifier, the fifth identifier indicates that the second network device includes the second user group, and the sixth identifier indicates that the second network device does not include the second user group. For an implementation of determining the forwarding policy by the second network device, refer to the foregoing implementations related to the second identifier and the third identifier. Details are not described herein.

In the foregoing implementation, the source end interworking policy is a first group policy, and may be identified by the first group policy identifier. Correspondingly, the destination end interworking policy is a second group policy, and may be identified by a second group policy identifier. A specific group policy included in the second group policy may be a subpolicy. For example, the second group policy includes a first subpolicy. The first subpolicy indicates an interworking policy that is determined by the second user group when the first network device includes the first user group and the second network device does not include the second user group. For example, the second group policy includes a second subpolicy. The second subpolicy indicates an interworking policy that is determined by the second user group when the first network device does not include the first user group and the second network device includes the second user group.

According to the foregoing implementation, an SRv6 packet transmitted between the first network device and the second network device carries group information, so that the second network device serving as a receiving end device may control a forwarding policy of a user group according to an interworking policy determined by a transmitting end device and an interworking policy determined by the receiving end device.

Figure 5:
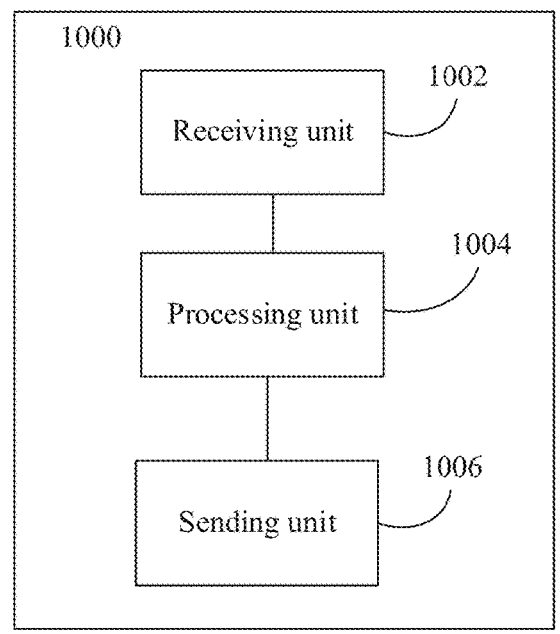
FIG. 5 is a schematic diagram of a structure of a first network device according to an embodiment of this disclosure.

FIG. 5 is a schematic diagram of a structure of a first network device 1000 according to an embodiment of this disclosure. The first network device 1000 shown in FIG. 5 may perform the corresponding steps performed by the first network device in the method in the foregoing embodiment. The first network device 1000 is deployed in a communication network, and the communication network further includes a second network device. As shown in FIG. 5, the first network device 1000 includes a receiving unit 1002, a processing unit 1004, and a sending unit 1006.

The receiving unit 1002 is configured to receive a first service packet sent by first user equipment, where the first service packet includes information about the first user equipment, and a destination of the first service packet is second user equipment.

The processing unit 1004 is configured to determine whether the first network device includes a first user group corresponding to the information about the first user equipment, where the first user group is a user group to which the first user equipment belongs.

The processing unit 1004 is further configured to: determine, based on a determining result of whether the first network device includes the first user group corresponding to the information about the first user equipment, a value of first group information, and generate a first SRv6 packet, where the first SRv6 packet includes the first group information and the first service packet, and the first group information indicates an interworking policy that is determined by the first network device based on the first user group and that is for transmitting the first service packet between the first user equipment and the second user equipment.

The sending unit 1006 is configured to send the first SRv6 packet to the second network device, where the second network device communicates with the second user equipment.

Optionally, the first group information includes a first group identifier, the first group identifier indicates a user group to which the first user equipment belongs, and that the processing unit 1004 determines, based on the determining result of whether the first network device includes the first user group corresponding to the information about the first user equipment, the value of the first group information includes: in response to that the processing unit 1004 determines that the first network device includes the first user group corresponding to the information about the first user equipment, the processing unit 1004 is configured to determine that a value of the first group identifier indicates the first user group.

Optionally, the first group information includes a first group identifier, the first group identifier indicates a user group to which the first user equipment belongs, and that the processing unit 1004 determines, based on the determining result of whether the first network device includes the first user group corresponding to the information about the first user equipment, the value of the first group information includes: in response to that the processing unit 1004 determines that the first network device does not include the first user group corresponding to the information about the first user equipment, the processing unit 1004 is configured to determine that a value of the first group identifier indicates "invalid".

Optionally, the first group information includes a first group identifier and a first group policy identifier, the first group identifier indicates a user group to which the first user equipment belongs, and the first group policy identifier indicates a specific interworking policy.

Optionally, the first group policy identifier includes a first identifier, the first identifier indicates that the first network device includes the first user group and the second network device does not include a second user group, the second user group is a user group to which the second user equipment belongs, and that the processing unit 1004 determines, based on the determining result of whether the first network device includes the first user group corresponding to the information about the first user equipment, the value of the first group information includes: in response to that the processing unit 1004 determines that the first network device includes the first user group corresponding to the information about the first user equipment, the processing unit 1004 is configured to: determine that a value of the first group identifier indicates the first user group, and determine a value of the first identifier.

Optionally, the first group policy identifier includes a second identifier and a third identifier, the second identifier indicates that the first network device does not include the first user group and the second network device includes a second user group, the third identifier indicates that the first network device does not include the first user group and the second network device does not include the second user group, the second user group is a user group to which the second user equipment belongs, and that the processing unit 1004 determines, based on the determining result of whether the first network device includes the first user group corresponding to the information about the first user equipment, the value of the first group information includes: in response to that the processing unit 1004 determines that the first network device includes the first user group corresponding to the information about the first user equipment, the processing unit 1004 is configured to: determine that a value of the first group identifier indicates "invalid", and determine a value of the second identifier and a value of the third identifier.

Optionally, the first group policy identifier includes a fourth identifier, the fourth identifier indicates that the second network device does not include a second user group, the second user group is a user group to which the second user equipment belongs, and that the processing unit 1004 determines, based on the determining result of whether the first network device includes the first user group corresponding to the information about the first user equipment, the value of the first group information includes: in response to that the processing unit 1004 determines that the first network device includes the first user group corresponding to the information about the first user equipment, the processing unit is configured to: determine that a value of the first group identifier indicates the first user group, and determine a value of the fourth identifier.

Optionally, the first group policy identifier includes a fifth identifier and a sixth identifier, the fifth identifier indicates that the second network device includes a second user group, the sixth identifier indicates that the second network device does not include the second user group, the second user group is a user group to which the second user equipment belongs, and that the processing unit 1004 determines, based on the determining result of whether the first network device includes the first user group corresponding to the information about the first user equipment, the value of the first group information includes: in response to that the processing unit 1004 determines that the first network device includes the first user group corresponding to the information about the first user equipment, the processing unit 1004 is configured to: determine that a value of the first group identifier indicates "invalid", and determine a value of the fifth identifier and a value of the sixth identifier.

Optionally, the first group identifier is carried in any one of the following headers included in the first SRv6 packet: an IPv6 header, a hop-by-hop options header, a destination options header, and a segment routing header.

Optionally, the first group policy identifier is carried in any one of the following headers included in the first SRv6 packet: an IPv6 header, a hop-by-hop options header, a destination options header, and a segment routing header.

Optionally, the first SRv6 packet is transmitted through an SRv6 tunnel between the first network device and the second network device.

Optionally, the information about the first user equipment is a source IP address included in the first service packet, or the information about the first user equipment is a source MAC address included in the first service packet.

The first network device 1000 shown in FIG. 5 may perform the corresponding steps performed by the first network device in the method in the foregoing embodiment. An SRv6 packet sent by the first network device to the second network device carries group information, so that the first network device serving as a transmitting end device may participate in control of determining a forwarding policy for a user group.

Figure 6:
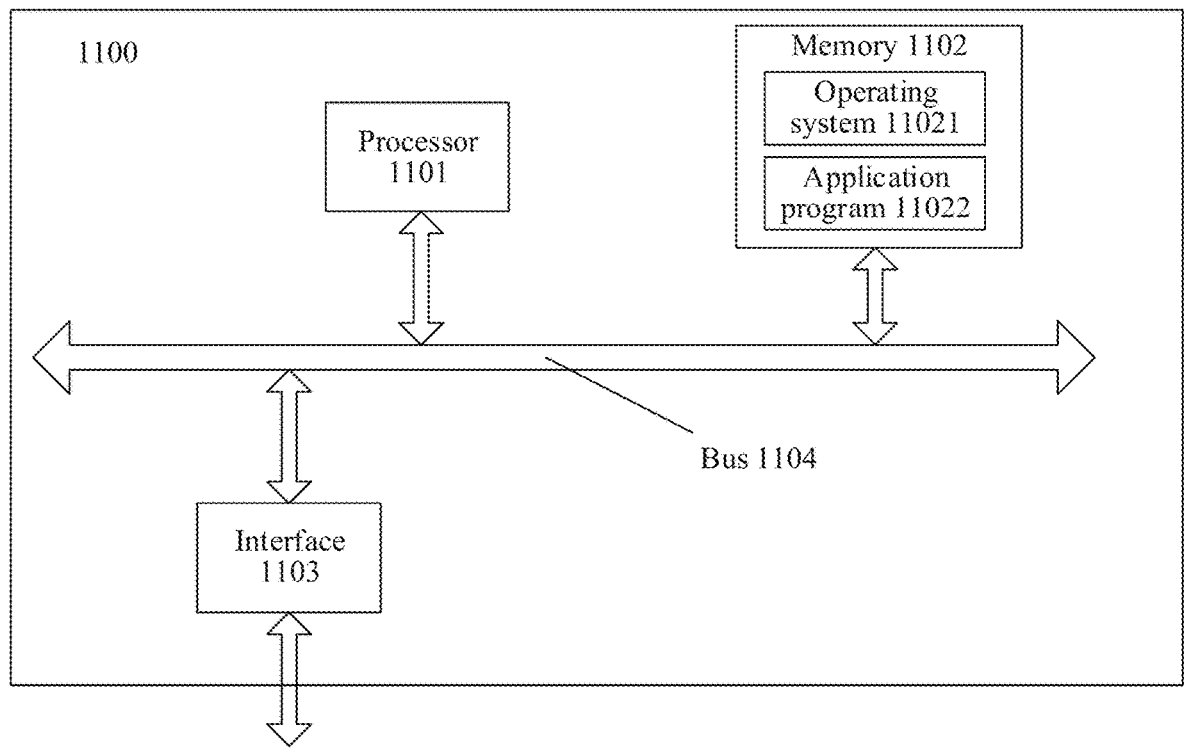
FIG. 6 is a schematic diagram of a hardware structure of a first network device according to an embodiment of this disclosure.

FIG. 6 is a schematic diagram of a hardware structure of a first network device 1100 according to an embodiment of this disclosure. The first network device 1100 shown in FIG. 6 may perform the corresponding steps performed by the first network device in the method in the foregoing embodiment.

As shown in FIG. 6, the first network device 1100 includes a processor 1101, a memory 1102, an interface 1103, and a bus 1104. The interface 1103 may be implemented in a wireless or wired manner. The processor 1101, the memory 1102, and the interface 1103 are connected through the bus 1104.

The interface 1103 may include a transmitter and a receiver, is configured to receive and send information between the first network device and the second network device in the foregoing embodiment, and is configured to receive and send information between the first network device and the first user equipment in the foregoing embodiment. For example, the interface 1103 is configured to support receiving a first service packet sent by the first user equipment. In addition, the interface 1103 is configured to support sending a first SRv6 packet to the second network device. For example, the interface 1103 is configured to support the processes S101 and S104 in FIG. 2. The processor 1101 is configured to perform the processing performed by the first network device in the foregoing embodiment. For example, the processor 1101 is configured to perform an action of determining a user group to which the first user equipment belongs, an action of determining an interworking policy based on a determining result, and an action of generating the first SRv6 packet, and/or another process of the technology described in this specification. For example, the processor 1101 is configured to support the processes S102 and S103 in FIG. 2. The memory 1102 is configured to store a program, code, or instructions, for example, store an operating system 11021 and an application program 11022. When executing the program, the code, or the instructions, the processor or a hardware device can complete the processing process related to the first network device in the method embodiment. Optionally, the memory 1102 may include a read-only memory (ROM) and a random access memory (RAM). The ROM includes a basic input/output system (BIOS) or an embedded system, and the RAM includes an application program and an action system. When the first network device 1100 needs to run, a bootloader in the BIOS or the embedded system that is firmed in the ROM is used to boot a system to start, and boot the first network device 1100 to enter a normal running state. After entering the normal running state, the first network device 1100 runs the application program and the action system in the RAM, to complete the processing process related to the first network device in the method embodiment.

It may be understood that FIG. 6 shows merely a simplified design of the first network device 1100. The first network device may include any quantity of interfaces, processors, or memories during actual application.

Figure 7:
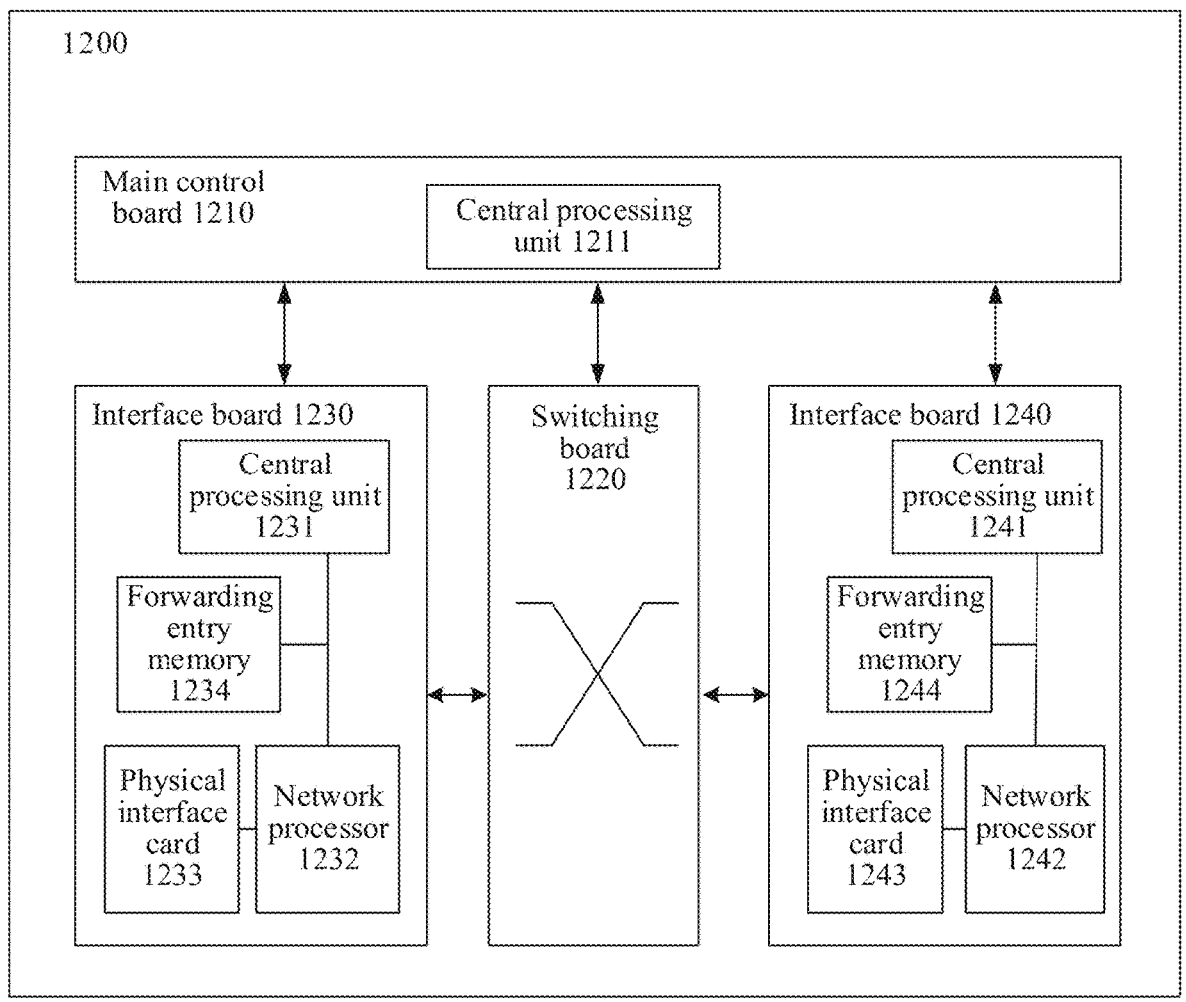
FIG. 7 is a schematic diagram of a hardware structure of another first network device according to an embodiment of this disclosure.

FIG. 7 is a schematic diagram of a hardware structure of another first network device 1200 according to an embodiment of this disclosure. The first network device 1200 shown in FIG. 7 may perform the corresponding steps performed by the first network device in the method in the foregoing embodiment.

As shown in FIG. 7, the first network device 1200 includes a main control board 1210, an interface board 1230, a switching board 1220, and an interface board 1240. The main control board 1210, the interface boards 1230 and 1240, and the switching board 1220 are connected to a system backboard through a system bus for communication. The main control board 1210 is configured to complete functions such as system management, device maintenance, and protocol processing. The switching board 1220 is configured to exchange data between interface boards (where the interface board is also referred to as a line card or a service board). The interface boards 1230 and 1240 are configured to: provide various service interfaces (such as a POS interface, a GE interface, and an ATM interface), and forward a data packet.

The interface board 1230 may include a central processing unit 1231, a forwarding entry memory 1234, a physical interface card 1233, and a network processor 1232. The central processing unit 1231 is configured to: control and manage the interface board, and communicate with a central processing unit on the main control board. The forwarding entry memory 1234 is configured to store a forwarding entry. The physical interface card 1233 is configured to receive and send traffic. The network processor 1232 is configured to control, based on the forwarding entry, the physical interface card 1233 to receive and send the traffic.

Specifically, the physical interface card 1233 is configured to receive a first service packet sent by first user equipment. The physical interface card 1233 is further configured to send a first SRv6 packet to a second network device.

After receiving the first service packet, the physical interface card 1233 sends the first service packet to the central processing unit 1231. The central processing unit 1231 determines, based on information in a packet header of the first service packet, that the first service packet needs to be processed by the central processing unit 1231. Correspondingly, the central processing unit 1231 processes the first service packet.

Optionally, after receiving the first service packet, the physical interface card 1233 sends the first service packet to the central processing unit 1231. The central processing unit 1231 determines, based on information in a packet header of the first service packet, that the first service packet needs to be processed by a central processing unit 1211. The central processing unit 1231 sends the first service packet to the central processing unit 1211, and the central processing unit 1211 processes the first service packet.

The central processing unit 1231 is further configured to control the network processor 1232 to obtain the forwarding entry in the forwarding entry memory 1234, and the central processing unit 1231 is further configured to control the network processor 1232 to send the first SRv6 packet to the second network device via the physical interface card 1233.

It can be understood that actions on the interface board 1240 are consistent with actions on the interface board 1230 in this embodiment of the present invention. For brevity, details are not described again. It can be understood that the first network device 1200 in this embodiment may correspond to the functions and/or the various implemented steps in the foregoing method embodiment. Details are not described herein again.

In addition, it is to be noted that there may be one or more main control boards. When there are a plurality of main control boards, the main control boards may include an active main control board and a standby main control board. There may be one or more interface boards. A first network device having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the first network device may not include a switching board, and the interface board undertakes a service data processing function of an entire system. In a distributed forwarding architecture, the first network device may have at least one switching board, and exchange data between a plurality of interface boards through the switching board, to provide a large-capacity data exchange and processing capability. Therefore, a data access and processing capability of the first network device in the distributed architecture is better than that of the device in the centralized architecture. A specific architecture to be used depends on a specific networking deployment scenario, and is not limited herein.

In addition, an embodiment of this disclosure provides a computer storage medium, configured to store computer software instructions used by the foregoing first network device. The computer storage medium includes a program designed for performing the foregoing method embodiment.

Figure 8:
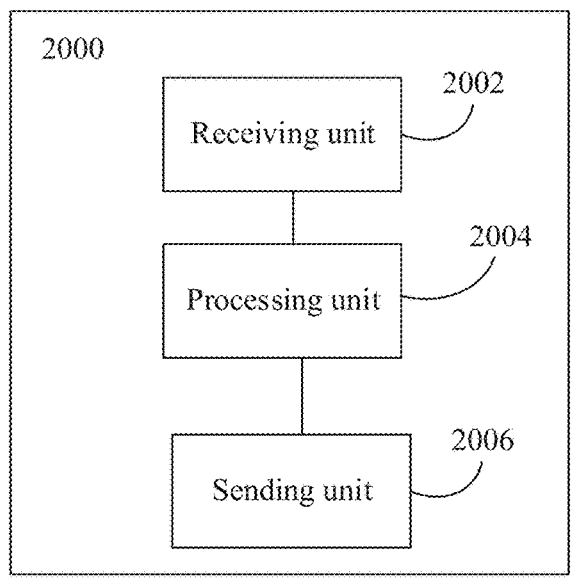
FIG. 8 is a schematic diagram of a structure of a second network device according to an embodiment of this disclosure.

FIG. 8 is a schematic diagram of a structure of a second network device 2000 according to an embodiment of this disclosure. The second network device 2000 shown in FIG. 8 may perform the corresponding steps performed by the second network device in the method in the foregoing embodiment. The second network device is deployed in a communication network, and the communication network further includes a first network device. As shown in FIG. 8, the second network device 2000 includes a receiving unit 2002 and a processing unit 2004.

The receiving unit 2002 is configured to receive a first SRv6 packet sent by the first network device, where the first SRv6 packet includes first group information and a first service packet, the first group information indicates an interworking policy that is determined by the first network device based on a first user group and that is for transmitting the first service packet between first user equipment and second user equipment, the first service packet is from the first user equipment, a destination of the first service packet is the second user equipment, the first user group is a user group to which the first user equipment belongs, and the first service packet includes information about the second user equipment.

The processing unit 2004 is configured to determine whether the second network device includes a second user group corresponding to the information about the second user equipment, where the second user group is a user group to which the second user equipment belongs.

The processing unit 2004 is further configured to determine, based on the first group information and a determining result of whether the second network device includes the second user group corresponding to the information about the second user equipment, a forwarding policy for forwarding the first service packet to the second user equipment.

Optionally, the second network device further includes a sending unit 2006, the first group information includes a first group identifier, the first group identifier indicates a user group to which the first user equipment belongs, and that the processing unit 2004 determines, based on the first group information and the determining result of whether the second network device includes the second user group corresponding to the information about the second user equipment, the forwarding policy for forwarding the first service packet to the second user equipment includes: in response to that the processing unit 2004 determines that the second network device includes the second user group corresponding to the information about the second user equipment and that a value of the first group identifier indicates the first user group, the sending unit 2006 is configured to send the first service packet to the second user equipment.

Optionally, the second network device further includes a sending unit 2006, the first group information includes a first group identifier, the first group identifier indicates a user group to which the first user equipment belongs, and that the processing unit 2004 determines, based on the first group information and the determining result of whether the second network device includes the second user group corresponding to the information about the second user equipment, the forwarding policy for forwarding the first service packet to the second user equipment includes: in response to that the processing unit 2004 determines that the second network device does not include the second user group corresponding to the information about the second user equipment and that a value of the first group identifier indicates the first user group, the sending unit 2006 is configured to send the first service packet to the second user equipment in a random drop manner or in a rate-limited forwarding manner.

Optionally, the second network device further includes a sending unit 2006, the first group information includes a first group identifier, the first group identifier indicates a user group to which the first user equipment belongs, and that the processing unit 2004 determines, based on the first group information and the determining result of whether the second network device includes the second user group corresponding to the information about the second user equipment, the forwarding policy for forwarding the first service packet to the second user equipment includes: in response to that the processing unit 2004 determines that the second network device includes the second user group corresponding to the information about the second user equipment and that a value of the first group identifier indicates "invalid", the sending unit 2006 is configured to send the first service packet to the second user equipment in a random drop manner or in a rate-limited forwarding manner.

Optionally, the first group information includes a first group identifier and a first group policy identifier, the first group identifier indicates a user group to which the first user equipment belongs, and the first group policy identifier indicates a specific interworking policy.

Optionally, that the processing unit 2004 determines, based on the first group information and the determining result of whether the second network device includes the second user group corresponding to the information about the second user equipment, the forwarding policy for forwarding the first service packet to the second user equipment includes: the processing unit 2004 is configured to determine a second group policy based on the determining result, where the second group policy indicates an interworking policy that is determined by the second network device based on the second user group and that is for transmitting the first service packet between the first user equipment and the second user equipment; and the processing unit 2004 is further configured to determine, according to the second group policy and the interworking policy that is indicated by the first group policy identifier, the forwarding policy for forwarding the first service packet to the second user equipment.

Optionally, that the processing unit 2004 determines, according to the second group policy and the interworking policy that is indicated by the first group policy identifier, the forwarding policy for forwarding the first service packet to the second user equipment includes: the processing unit 2004 is configured to determine that a value of a first identifier in the first group policy identifier is valid, where the first identifier indicates that the first network device includes the first user group and the second network device does not include the second user group; the processing unit 2004 is further configured to determine a first subpolicy in the second group policy based on the first identifier, where the first subpolicy indicates an interworking policy that is determined by the second user group when the first network device includes the first user group and the second network device does not include the second user group; and the processing unit 2004 is further configured to determine, according to the first subpolicy and an interworking policy that is indicated by a value of the first identifier, the forwarding policy for forwarding the first service packet to the second user equipment.

Optionally, that the processing unit 2004 determines, according to the second group policy and the interworking policy that is indicated by the first group policy identifier, the forwarding policy for forwarding the first service packet to the second user equipment includes: the processing unit 2004 is configured to determine that values of a second identifier and a third identifier in the first group policy identifier are valid, where the second identifier indicates that the first network device does not include the first user group and the second network device includes the second user group, and the third identifier indicates that the first network device does not include the first user group and the second network device does not include the second user group; the processing unit 2004 is further configured to determine a second subpolicy in the second group policy based on the second identifier and the third identifier, where the second subpolicy indicates an interworking policy that is determined by the second user group when the first network device does not include the first user group and the second network device includes the second user group; and the processing unit 2004 is further configured to determine, according to the second subpolicy and an interworking policy that is indicated by a value of the second identifier, the forwarding policy for forwarding the first service packet to the second user equipment.

Optionally, that the processing unit 2004 determines, based on the first group information and the determining result of whether the second network device includes the second user group corresponding to the information about the second user equipment, the forwarding policy for forwarding the first service packet to the second user equipment includes: the processing unit 2004 is configured to determine a second group policy based on the determining result, where the second group policy indicates an interworking policy that is determined by the second network device based on the second user group and that is for transmitting the first service packet between the first user equipment and the second user equipment; and the processing unit 2004 is further configured to determine, based on the first group identifier and according to the second group policy and the interworking policy that is indicated by the first group policy identifier, the forwarding policy for forwarding the first service packet to the second user equipment.

Optionally, the forwarding policy is any one of the following forwarding policies: forwarding, dropping, forwarding in a random drop manner, and forwarding in a rate-limited forwarding manner.

Optionally, the first group information is carried in any one of the following headers included in the first SRv6 packet: an IPv6 header, a hop-by-hop options header, a destination options header, and a segment routing header.

Optionally, the first SRv6 packet is transmitted through an SRv6 tunnel between the first network device and the second network device.

Optionally, the information about the second user equipment is a destination IP address included in the first service packet, or the information about the second user equipment is a destination MAC address included in the first service packet.

The second network device 2000 shown in FIG. 8 may perform the corresponding steps performed by the second network device in the method in the foregoing embodiment. The second network device receives the first SRv6 sent by the first network device, and the second network device serving as a receiving end device may control a forwarding policy of a user group according to an interworking policy determined by a transmitting end device and an interworking policy determined by the receiving end device.

Figure 9:
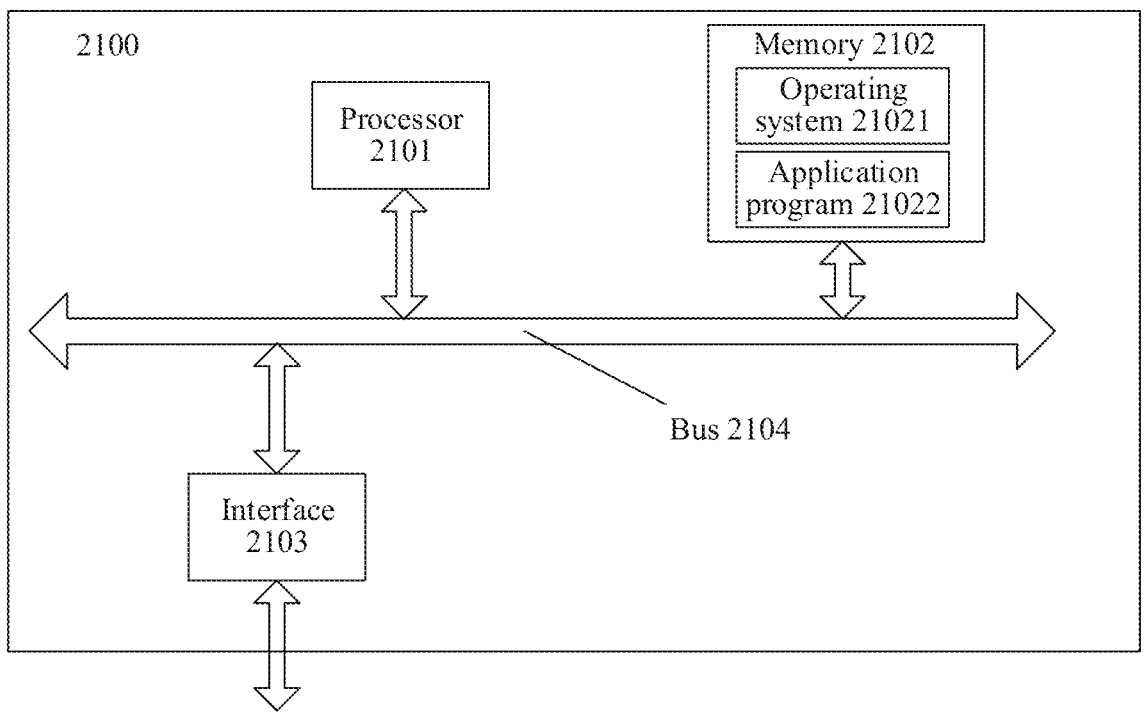
FIG. 9 is a schematic diagram of a hardware structure of a second network device according to an embodiment of this disclosure.

FIG. 9 is a schematic diagram of a hardware structure of a second network device 2100 according to an embodiment of this disclosure. The second network device 2100 shown in FIG. 9 may perform the corresponding steps performed by the second network device in the method in the foregoing embodiment.

As shown in FIG. 9, the second network device 2100 includes a processor 2101, a memory 2102, an interface 2103, and a bus 2104. The interface 2103 may be implemented in a wireless or wired manner. The processor 2101, the memory 2102, and the interface 2103 are connected through the bus 2104.

The interface 2103 may include a transmitter and a receiver, and is configured to receive and send information or data between the second network device and the first network device in the foregoing embodiment. For example, the interface 2103 is configured to support receiving a first SRv6 packet sent by the first network device. For example, the interface 2103 is configured to support the process S105 in FIG. 2. The processor 2101 is configured to perform the processing performed by the second network device in the foregoing embodiment. For example, the processor 2101 is configured to: receive the first SRv6 packet sent by the first network device, determine a second user group, and determine, according to an interworking policy determined by the first network device and an interworking policy determined by the second network device, a forwarding policy for forwarding a first service packet, and/or perform another process of the technology described in this specification. For example, the processor 2101 is configured to support the processes S106 and S107 in FIG. 2. The memory 2102 includes an operating system 21021 and an application program 21022, and is configured to store a program, code, or instructions. When executing the program, the code, or the instructions, the processor or a hardware device can complete the processing process related to the second network device in the method embodiment. Optionally, the memory 2102 may include a read-only memory (ROM) and a random access memory (RAM). The ROM includes a basic input/output system (BIOS) or an embedded system, and the RAM includes an application program and an action system. When the second network device 2100 needs to run, a bootloader in the BIOS or the embedded system that is firmed in the ROM is used to boot a system to start, and boot the second network device 2100 to enter a normal running state. After entering the normal running state, the second network device 2100 runs the application program and the action system in the RAM, to complete the processing process related to the second network device in the method embodiment.

It may be understood that FIG. 9 shows merely a simplified design of the second network device 2100. The second network device may include any quantity of interfaces, processors, or memories during actual application.

Figure 10:
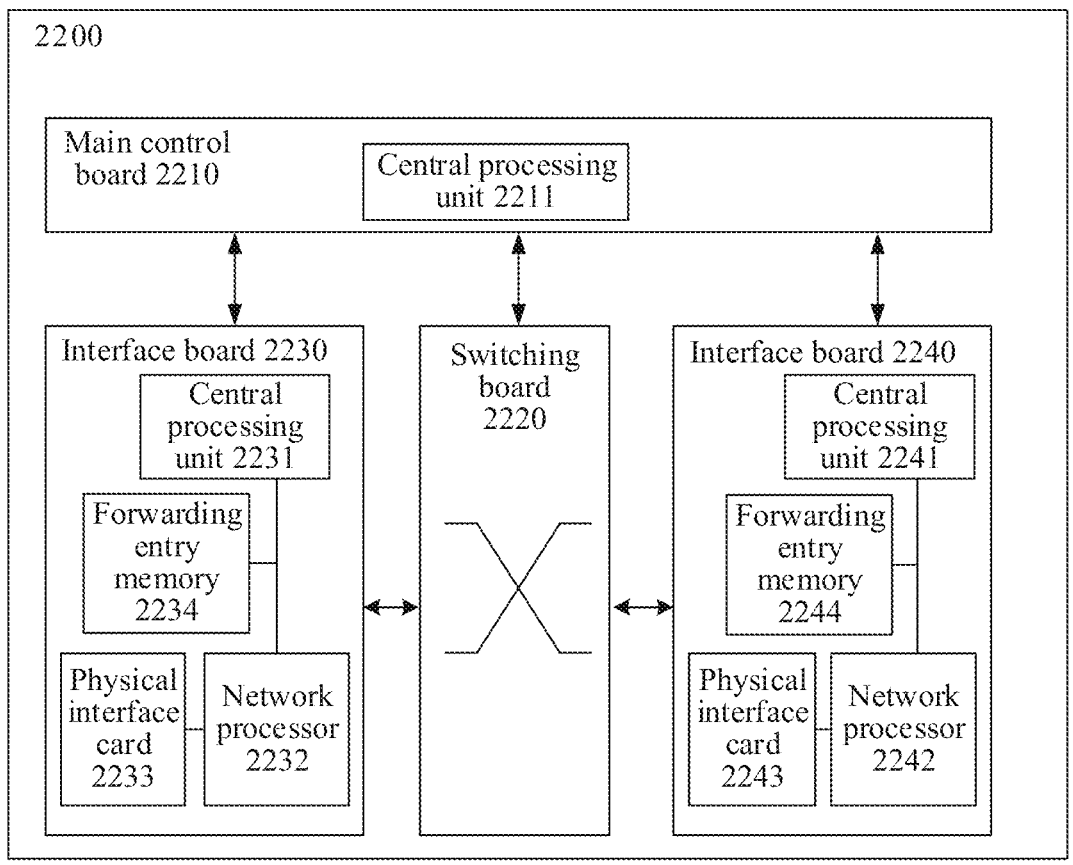
FIG. 10 is a schematic diagram of a hardware structure of another second network device according to an embodiment of this disclosure.

FIG. 10 is a schematic diagram of a hardware structure of another second network device 2200 according to an embodiment of this disclosure. The second network device 2200 shown in FIG. 10 may perform the corresponding steps performed by the second network device in the method in the foregoing embodiment.

As shown in FIG. 10, the second network device 2200 includes a main control board 2210, an interface board 2230, a switching board 2220, and an interface board 2240. The main control board 2210, the interface boards 2230 and 2240, and the switching board 2220 are connected to a system backboard through a system bus for communication. The main control board 2210 is configured to complete functions such as system management, device maintenance, and protocol processing. The switching board 2220 is configured to exchange data between interface boards (where the interface board is also referred to as a line card or a service board). The interface boards 2230 and 2240 are configured to: provide various service interfaces (such as a POS interface, a GE interface, and an ATM interface), and forward a data packet. In a possible implementation, the second network device 2200 is a blade server.

The interface board 2230 may include a central processing unit 2231, a forwarding entry memory 2234, a physical interface card 2233, and a network processor 2232. The central processing unit 2231 is configured to: control and manage the interface board, and communicate with a central processing unit 2211 on the main control board 2210. The forwarding entry memory 2234 is configured to store a forwarding entry. The physical interface card 2233 is configured to receive and send traffic. The network processor 2232 is configured to control, based on the forwarding entry, the physical interface card 2233 to receive and send the traffic.

Specifically, the physical interface card 2233 is configured to receive a first SRv6 packet sent by a first network device. The physical interface card 2233 is further configured to forward a first service packet.

After receiving the first SRv6 packet, the physical interface card 2233 sends the first SRv6 packet to the central processing unit 2231. The central processing unit 2231 determines, based on information in a packet header of the first SRv6 packet, that the first SRv6 packet needs to be processed by the central processing unit 2231. Correspondingly, the central processing unit 2231 processes the first SRv6 packet.

Optionally, after receiving the first SRv6 packet, the physical interface card 2233 sends the first SRv6 packet to the central processing unit 2231. The central processing unit 2231 determines, based on information in a packet header of the first SRv6 packet, that the first SRv6 packet needs to be processed by the central processing unit 2211. The central processing unit 2231 sends the first SRv6 packet to the central processing unit 2211, and the central processing unit 2211 processes the first SRv6 packet.

The central processing unit 2231 is further configured to control the network processor 2232 to obtain the forwarding entry in the forwarding entry memory 2234, and the central processing unit 2231 is further configured to control the network processor 2232 to receive and send the traffic via the physical interface card 2233.

It can be understood that actions on the interface board 2240 are consistent with actions on the interface board 2230 in this embodiment of the present invention. For brevity, details are not described again. It can be understood that the second network device 2200 in this embodiment may correspond to the functions and/or the various implemented steps in the foregoing method embodiment. Details are not described herein again.

In addition, it is to be noted that there may be one or more main control boards. When there are a plurality of main control boards, the main control boards may include an active main control board and a standby main control board. There may be one or more interface boards. A second network device having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the second network device may not include a switching board, and the interface board undertakes a service data processing function of an entire system. In a distributed forwarding architecture, the second network device may have at least one switching board, and exchange data between a plurality of interface boards through the switching board, to provide a large-capacity data exchange and processing capability. Therefore, a data access and processing capability of the second network device in the distributed architecture is better than that of the device in the centralized architecture. A specific architecture to be used depends on a specific networking deployment scenario, and is not limited herein.

In addition, an embodiment of this disclosure provides a computer storage medium, configured to store computer software instructions used by the foregoing second network device. The computer storage medium includes a program designed for performing the foregoing method embodiment.

An embodiment of this disclosure further includes a network system. The network system includes a first network device and a second network device. The first network device is the first network device in FIG. 5, FIG. 6, or FIG. 7, and the second network device is the second network device in FIG. 8, FIG. 9, or FIG. 10.

Method or algorithm steps described in combination with the content disclosed in this disclosure may be implemented by hardware, or may be implemented by a processor by executing software instructions. The software instructions may include a corresponding software module. The software module may be stored in a RAM memory, a flash memory, a ROM memory, an EPROM memory, an EEPROM memory, a register, a hard disk, a removable hard disk, a CD-ROM memory, or a storage medium in any other form well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in user equipment. Certainly, the processor and the storage medium may exist in the user equipment as discrete components.

A person skilled in the art should be aware that in the foregoing one or more examples, functions described in this disclosure may be implemented by hardware or a combination of hardware and software. When the functions are implemented by the combination of hardware and software, the software may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a general-purpose or dedicated computer.

The objectives, technical solutions, and beneficial effects of this disclosure are further described in detail in the foregoing specific implementations. It should be understood that the foregoing descriptions are merely specific implementations of this disclosure.

What is claimed is:

1. A user group-based packet forwarding method, comprising:
   receiving, by a first network device, a first service packet sent by first user equipment, wherein the first service packet comprises information about the first user equipment, and a destination of the first service packet is second user equipment;
   determining, by the first network device, whether the first network device comprises a first user group corresponding to the information about the first user equipment, wherein the first user group is a user group to which the first user equipment belongs;
   determining, by the first network device based on a determining result of whether the first network device comprises the first user group corresponding to the information about the first user equipment, first group information indicating an interworking policy for transmitting the first service packet between the first user equipment and the second user equipment;
   generating a first segment routing over internet protocol version 6 (SRv6) packet that comprises the first group information and the first service packet; and
   sending, by the first network device, the first SRv6 packet to a second network device, wherein the second network device communicates with the second user equipment.

2. The method according to claim 1, wherein the first group information comprises a first group identifier having a value indicating the first user group to which the first user equipment belongs.

3. The method according to claim 1, wherein the first group information comprises a first group identifier having a value indicating "invalid" when determining that the first network device does not comprise the first user group corresponding to the information about the first user equipment.

4. The method according to claim 1, wherein the first group information comprises a first group identifier and a first group policy identifier, the first group identifier indicating the first user group to which the first user equipment belongs or "invalid", and the first group policy identifier indicating the interworking policy.

5. The method according to claim 4, wherein the first group policy identifier comprises a first identifier having a value indicating that the first network device comprises the first user group and the second network device does not comprise a second user group, the second user group being a user group to which the second user equipment belongs.

6. The method according to claim 1, wherein the first group information comprises a first group identifier and a first group policy identifier, the first group identifier being set to a value indicating "invalid" when determining that the first network device does not comprise the first user group corresponding to the information about the first user equipment, wherein the first group policy identifier comprises at least one of a second identifier or a third identifier, the second identifier having a value indicating that the first network device does not comprise the first user group and the second network device comprises a second user group, the third identifier indicating that the first network device does not comprise the first user group and the second network device does not comprise the second user group, the second user group being a user group to which the second user equipment belongs.

7. The method according to claim 4, wherein the first group policy identifier is carried in any one of the following:

an internet protocol version 6 (IPv6) header in the first SRv6 packet, a hop-by-hop options header in the first SRv6 packet, a destination options header in the first SRv6 packet, or a segment routing header in the first SRv6 packet.

8. The method according to claim 1, wherein the information about the first user equipment is a source internet protocol (IP) address included in the first service packet, or the information about the first user equipment is a source media access control (MAC) address included in the first service packet.

9. A first network device, comprising:
a processor; and
a memory coupled to the processor and configured to store instructions that, when executed by the processor, cause the first network device to:
receive a first service packet sent by first user equipment, wherein the first service packet comprises information about the first user equipment, and a destination of the first service packet is second user equipment;
determine whether the first network device comprises a first user group corresponding to the information about the first user equipment, wherein the first user group is a user group to which the first user equipment belongs;
determine, based on a determining result of whether the first network device comprises the first user group corresponding to the information about the first user equipment, first group information indicating an interworking policy for transmitting the first service packet between the first user equipment and the second user equipment; and
generate a first segment routing over internet protocol version 6 (SRv6) packet that comprises the first group information and the first service packet; and
send the first SRv6 packet to a second network device that communicates with the second user equipment.

10. The first network device according to claim 9, wherein the first group information comprises a first group identifier having a value indicating the first user group to which the first user equipment belongs.

11. The first network device according to claim 9, wherein the first group information comprises a first group identifier having a value indicating "invalid" when determining that the first network device does not comprise the first user group corresponding to the information about the first user equipment.

12. The first network device according to claim 9, wherein the first group information comprises a first group identifier and a first group policy identifier, the first group identifier indicating the first user group to which the first user equipment belongs or "invalid", and the first group policy identifier indicating the interworking policy.

13. The first network device according to claim 12, wherein the first group policy identifier comprises a first identifier indicating that the first network device comprises the first user group and the second network device does not comprise a second user group, the second user group being a user group to which the second user equipment belongs.

14. The first network device according to claim 9, wherein the first group information comprises a first group identifier and a first group policy identifier, the first group identifier being set to a value indicating "invalid" when determining that the first network device does not comprise the first user group corresponding to the information about the first user equipment, wherein the first group policy identifier comprises at least one of a second identifier or a third identifier, the second identifier having a value indicating that the first network device does not comprise the first user group and the second network device comprises a second user group, the third identifier having a value indicating that the first network device does not comprise the first user group and the second network device does not comprise the second user group, the second user group being a user group to which the second user equipment belongs.

15. The first network device according to claim 12, wherein the first group policy identifier is carried in any one of the following:
an internet protocol version 6 (IPv6) header in the first SRv6 packet, a hop-by-hop options header in the first SRv6 packet, a destination options header in the first SRv6 packet, or a segment routing header in the first SRv6 packet.

16. The first network device according to claim 9, wherein the information about the first user equipment is a source internet protocol (IP) address included in the first service packet, or the information about the first user equipment is a source media access control (MAC) address included in the first service packet.

17. A second network device, comprising:
a processor; and
a memory coupled to the processor and configured to store instructions that, when executed by the processor, cause the second network device to:
receive, from a first network device, a first segment routing over internet protocol version 6 (SRv6) packet that comprises first group information and first service packet, the first service packet being sent by first user equipment to second equipment, the first group information indicating an interworking policy for transmitting the first service packet between the first user equipment and the second user equipment; and
in response to the reception of the first SRv6 packet, determine whether the second network device comprises a second user group corresponding to the information about the second user equipment;
determine, based on the first group information and a determining result of whether the second network device comprises the second user group corresponding to the information about the second user equipment, a forwarding policy for forwarding the first service packet to the second user equipment.

18. The second network device according to claim 17, wherein the first group information comprises a first group identifier indicating a first user group to which the first user equipment belongs, the instructions, when executed by the processor, further cause the second network device to:
in response to determining that the second network device comprises the second user group corresponding to the information about the second user equipment and that the first group identifier indicates the first user group to which the first user equipment belongs, send the first service packet to the second user equipment.

19. The second network device according to claim 17, wherein the first group information comprises a first group identifier, the first group identifier indicates a first user group to which the first user equipment belongs, the instructions, when executed by the processor, further cause the second network device to:
in response to determining that the second network device does not comprise the second user group corresponding to the information about the second user equipment and the first group identifier indicates the first user group to which the first user equipment belongs, send the first service packet to the second user equipment in a random drop manner or in a rate-limited forwarding manner.

20. The second network device according to claim 17, wherein the first group information comprises a first group identifier and a first group policy identifier, the first group identifier indicates a first user group to which the first user equipment belongs or "invalid", and the first group policy identifier indicates the interworking policy.

* * * * *